US011896905B2

(12) United States Patent
Marr et al.

(10) Patent No.: US 11,896,905 B2
(45) Date of Patent: Feb. 13, 2024

(54) METHODS AND SYSTEMS FOR CONTINUING TO EXECUTE A SIMULATION AFTER PROCESSING RESOURCES GO OFFLINE

(71) Applicant: Activision Publishing, Inc., Santa Monica, CA (US)

(72) Inventors: Michael D. Marr, Monroe, WA (US); Keith S. Kaplan, Bothell, WA (US); Nathan T. Lewis, Woodinville, WA (US)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

(21) Appl. No.: 18/054,238

(22) Filed: Nov. 10, 2022

(65) Prior Publication Data

US 2023/0108566 A1 Apr. 6, 2023

Related U.S. Application Data

(63) Continuation of application No. 16/397,741, filed on Apr. 29, 2019, now Pat. No. 11,524,237, which is a (Continued)

(51) Int. Cl.
*A63F 13/00* (2014.01)
*A63F 13/63* (2014.01)
(Continued)

(52) U.S. Cl.
CPC .............. *A63F 13/63* (2014.09); *A63F 13/34* (2014.09); *A63F 13/352* (2014.09); *A63F 13/358* (2014.09); *A63F 13/69* (2014.09)

(58) Field of Classification Search
CPC ...... A63F 13/34; A63F 13/352; A63F 13/358; A63F 13/48; A63F 13/493; A63F 13/55;
(Continued)

(56) References Cited

U.S. PATENT DOCUMENTS 4,461,301 A 7/1984 Ochs
4,908,761 A 3/1990 Tai
(Continued)

FOREIGN PATENT DOCUMENTS

AU 768367 3/2004
AU 2005215048 10/2011
(Continued)

OTHER PUBLICATIONS

Ma et al., "A Scalable Parallel Cell-Projection Volume Rendering Algorithm for Three-Dimensional Unstructured Data", IEEE 1997, pp. 1-10.
(Continued)

*Primary Examiner* — Dmitry Suhol
*Assistant Examiner* — Jason Pinheiro
(74) *Attorney, Agent, or Firm* — Novel IP

(57) ABSTRACT

A system and method is provided that simulates gameplay of non-player characters (NPCs) distributed across networked end user devices. The system may identify end user devices that are connected to the system through a network and are available to participate in a simulation in which each participating end user device is provided with one or more NPCs to be executed. An end user device may be available to participate when it has sufficient computing capacity, such as when in an idle or standby state. As such, the system may leverage spare computing capacity of networked end user devices to execute NPCs at networked end user devices during a simulation. In this manner, the behavior of an NPC may be tested using real-world conditions that may affect gameplay, such as a network connection quality, user-to-user game engine coordination and data exchanges, and/or other real-world conditions associated with networked end user devices.

20 Claims, 5 Drawing Sheets

Related U.S. Application Data continuation of application No. 14/712,359, filed on May 14, 2015, now Pat. No. 10,315,113.

(51) Int. Cl.
*A63F 13/34* (2014.01)
*A63F 13/358* (2014.01)
*A63F 13/352* (2014.01)
*A63F 13/69* (2014.01)

(58) Field of Classification Search
CPC .......... A63F 13/63; A63F 13/69; A63F 13/77; G06F 17/30283
See application file for complete search history.

(56) References Cited

U.S. PATENT DOCUMENTS

| | | |
|---|---|---|
| 5,031,089 A | 7/1991 | Liu |
| 5,058,180 A | 10/1991 | Khan |
| 5,365,360 A | 11/1994 | Torres |
| 5,371,673 A | 12/1994 | Fan |
| 5,432,934 A | 7/1995 | Levin |
| 5,442,569 A | 8/1995 | Osano |
| 5,493,692 A | 2/1996 | Theimer |
| 5,497,186 A | 3/1996 | Kawasaki |
| 5,530,796 A | 6/1996 | Wang |
| 5,539,883 A | 7/1996 | Allon |
| 5,561,736 A | 10/1996 | Moore |
| 5,563,946 A | 10/1996 | Cooper |
| 5,606,702 A | 2/1997 | Diel |
| 5,630,129 A | 5/1997 | Wheat |
| 5,685,775 A | 11/1997 | Bakoglu |
| 5,694,616 A | 12/1997 | Johnson |
| 5,706,507 A | 1/1998 | Schloss |
| 5,708,764 A | 1/1998 | Borrel |
| 5,726,883 A | 3/1998 | Levine |
| 5,736,985 A | 4/1998 | Lection |
| 5,736,990 A | 4/1998 | Barrus |
| 5,737,416 A | 4/1998 | Cooper |
| 5,745,113 A | 4/1998 | Jordan |
| 5,745,678 A | 4/1998 | Herzberg |
| 5,758,079 A | 5/1998 | Ludwig |
| 5,761,083 A | 6/1998 | Brown |
| 5,762,552 A | 6/1998 | Vuong |
| 5,768,511 A | 6/1998 | Galvin |
| 5,774,668 A | 6/1998 | Choquier |
| 5,793,365 A | 8/1998 | Tang |
| 5,825,877 A | 10/1998 | Dan |
| 5,828,839 A | 10/1998 | Moncreiff |
| 5,835,692 A | 11/1998 | Cragun |
| 5,860,137 A | 1/1999 | Raz |
| 5,877,763 A | 3/1999 | Berry |
| 5,878,233 A | 3/1999 | Schloss |
| 5,880,731 A | 3/1999 | Liles |
| 5,883,628 A | 3/1999 | Mullaly |
| 5,900,879 A | 5/1999 | Berry |
| 5,903,266 A | 5/1999 | Berstis |
| 5,903,271 A | 5/1999 | Bardon |
| 5,911,045 A | 6/1999 | Leyba |
| 5,920,325 A | 7/1999 | Morgan |
| 5,920,692 A | 7/1999 | Nguyen |
| 5,920,848 A | 7/1999 | Schutzer |
| 5,923,324 A | 7/1999 | Berry |
| 5,926,100 A | 7/1999 | Escolar |
| 5,933,818 A | 8/1999 | Kasravi |
| 5,938,722 A | 8/1999 | Johnson |
| 5,958,014 A | 9/1999 | Cave |
| 5,969,724 A | 10/1999 | Berry |
| 5,977,979 A | 11/1999 | Clough |
| 5,983,003 A | 11/1999 | Lection |
| 5,990,887 A | 11/1999 | Redpath |
| 5,990,888 A | 11/1999 | Blades |
| 6,006,223 A | 12/1999 | Agrawal |
| 6,008,848 A | 12/1999 | Tiwari |
| 6,009,455 A | 12/1999 | Doyle |
| 6,012,096 A | 1/2000 | Link |
| 6,014,145 A | 1/2000 | Bardon |
| 6,018,734 A | 1/2000 | Zhang |
| 6,021,268 A | 2/2000 | Johnson |
| 6,021,496 A | 2/2000 | Dutcher |
| 6,023,729 A | 2/2000 | Samuel |
| 6,025,839 A | 2/2000 | Schell |
| 6,032,129 A | 2/2000 | Greef |
| 6,049,819 A | 4/2000 | Buckle |
| 6,058,266 A | 5/2000 | Megiddo |
| 6,059,842 A | 5/2000 | Dumarot |
| 6,061,722 A | 5/2000 | Lipa |
| 6,067,355 A | 5/2000 | Lim |
| 6,069,632 A | 5/2000 | Mullaly |
| 6,070,143 A | 5/2000 | Barney |
| 6,076,093 A | 6/2000 | Pickering |
| 6,081,270 A | 6/2000 | Berry |
| 6,081,271 A | 6/2000 | Bardon |
| 6,088,727 A | 7/2000 | Hosokawa |
| 6,088,732 A | 7/2000 | Smith |
| 6,091,410 A | 7/2000 | Lection |
| 6,094,196 A | 7/2000 | Berry |
| 6,098,056 A | 8/2000 | Rusnak |
| 6,101,538 A | 8/2000 | Brown |
| 6,104,406 A | 8/2000 | Berry |
| 6,108,420 A | 8/2000 | Larose |
| 6,111,581 A | 8/2000 | Berry |
| 6,115,718 A | 9/2000 | Huberman |
| 6,134,588 A | 10/2000 | Guenthner |
| 6,138,128 A | 10/2000 | Perkowitz |
| 6,141,699 A | 10/2000 | Luzzi |
| 6,144,381 A | 11/2000 | Lection |
| 6,148,294 A | 11/2000 | Beyda |
| 6,148,328 A | 11/2000 | Cuomo |
| 6,157,953 A | 12/2000 | Chang |
| 6,177,932 B1 | 1/2001 | Galdes |
| 6,179,713 B1 | 1/2001 | James |
| 6,182,067 B1 | 1/2001 | Presnell |
| 6,185,614 B1 | 2/2001 | Cuomo |
| 6,195,657 B1 | 2/2001 | Rucker |
| 6,199,067 B1 | 3/2001 | Geller |
| 6,201,881 B1 | 3/2001 | Masuda |
| 6,212,494 B1 | 4/2001 | Boguraev |
| 6,212,548 B1 | 4/2001 | Desimone |
| 6,216,098 B1 | 4/2001 | Clancey |
| 6,222,551 B1 | 4/2001 | Schneider |
| 6,226,686 B1 | 5/2001 | Rothschild |
| 6,233,583 B1 | 5/2001 | Hoth |
| 6,249,779 B1 | 6/2001 | Hitt |
| 6,266,649 B1 | 7/2001 | Linden |
| 6,271,842 B1 | 8/2001 | Bardon |
| 6,271,843 B1 | 8/2001 | Lection |
| 6,275,820 B1 | 8/2001 | Navin-Chandra |
| 6,282,547 B1 | 8/2001 | Hirsch |
| 6,293,865 B1 | 9/2001 | Kelly |
| 6,301,609 B1 | 10/2001 | Aravamudan et al. |
| 6,308,208 B1 | 10/2001 | Jung |
| 6,311,206 B1 | 10/2001 | Malkin |
| 6,314,465 B1 | 11/2001 | Paul |
| 6,330,281 B1 | 12/2001 | Mann |
| 6,334,127 B1 | 12/2001 | Bieganski |
| 6,334,141 B1 | 12/2001 | Varma |
| 6,336,134 B1 | 1/2002 | Varma |
| 6,337,700 B1 | 1/2002 | Kinoe |
| 6,345,264 B1 | 2/2002 | Breese |
| 6,345,287 B1 | 2/2002 | Fong |
| 6,349,091 B1 | 2/2002 | Li |
| 6,351,775 B1 | 2/2002 | Yu |
| 6,353,449 B1 | 3/2002 | Gregg |
| 6,356,297 B1 | 3/2002 | Cheng |
| 6,360,254 B1 | 3/2002 | Linden |
| 6,363,174 B1 | 3/2002 | Lu |
| 6,370,560 B1 | 4/2002 | Robertazzi |
| 6,396,513 B1 | 5/2002 | Helfman |
| 6,411,312 B1 | 6/2002 | Sheppard |
| 6,418,424 B1 | 7/2002 | Hoffberg |
| 6,418,462 B1 | 7/2002 | Xu |
| 6,426,757 B1 | 7/2002 | Smith |
| 6,445,389 B1 | 9/2002 | Bossen |

(56) References Cited

U.S. PATENT DOCUMENTS

| | | |
|---|---|---|
| 6,452,593 B1 | 9/2002 | Challener |
| 6,462,760 B1 | 10/2002 | Cox, Jr. |
| 6,463,078 B1 | 10/2002 | Engstrom |
| 6,466,550 B1 | 10/2002 | Foster |
| 6,469,712 B1 | 10/2002 | Hilpert, Jr. |
| 6,473,085 B1 | 10/2002 | Brock |
| 6,473,103 B1 | 10/2002 | Bailey |
| 6,473,597 B1 | 10/2002 | Johnson |
| 6,476,830 B1 | 11/2002 | Farmer |
| 6,499,053 B1 | 12/2002 | Marquette |
| 6,501,834 B1 | 12/2002 | Milewski |
| 6,505,208 B1 | 1/2003 | Kanevsky |
| 6,509,925 B1 | 1/2003 | Dermler |
| 6,525,731 B1 | 2/2003 | Suits |
| 6,539,415 B1 | 3/2003 | Mercs |
| 6,549,933 B1 | 4/2003 | Barrett |
| 6,559,863 B1 | 5/2003 | Megiddo |
| 6,567,109 B1 | 5/2003 | Todd |
| 6,567,813 B1 | 5/2003 | Zhu |
| 6,574,477 B1 | 6/2003 | Rathunde |
| 6,580,981 B1 | 6/2003 | Masood |
| 6,594,673 B1 | 7/2003 | Smith |
| 6,601,084 B1 | 7/2003 | Bhaskaran |
| 6,618,751 B1 | 9/2003 | Challenger |
| 6,640,230 B1 | 10/2003 | Alexander |
| 6,641,481 B1 | 11/2003 | Mai |
| 6,645,153 B2 | 11/2003 | Kroll |
| RE38,375 E | 12/2003 | Herzberg |
| 6,657,617 B2 | 12/2003 | Paolini |
| 6,657,642 B1 | 12/2003 | Bardon |
| 6,684,255 B1 | 1/2004 | Martin |
| 6,717,600 B2 | 4/2004 | Dutta |
| 6,734,884 B1 | 5/2004 | Berry |
| 6,742,032 B1 | 5/2004 | Castellani |
| 6,765,596 B2 | 7/2004 | Lection |
| 6,781,607 B1 | 8/2004 | Benham |
| 6,801,930 B1 | 10/2004 | Dionne |
| 6,807,562 B1 | 10/2004 | Pennock |
| 6,819,669 B2 | 11/2004 | Rooney |
| 6,832,239 B1 | 12/2004 | Kraft |
| 6,836,480 B2 | 12/2004 | Basso |
| 6,845,389 B1 | 1/2005 | Sen |
| 6,854,007 B1 | 2/2005 | Hammond |
| 6,886,026 B1 | 4/2005 | Hanson |
| 6,901,379 B1 | 5/2005 | Balter |
| 6,941,236 B2 | 9/2005 | Huelsbergen |
| 6,948,168 B1 | 9/2005 | Kuprionas |
| RE38,865 E | 11/2005 | Dumarot |
| 6,970,929 B2 | 11/2005 | Bae |
| 6,993,596 B2 | 1/2006 | Hinton |
| 7,006,616 B1 | 2/2006 | Christofferson |
| 7,028,296 B2 | 4/2006 | Irfan |
| 7,031,473 B2 | 4/2006 | Morais |
| 7,050,868 B1 | 5/2006 | Graepel |
| 7,062,533 B2 | 6/2006 | Brown |
| 7,089,266 B2 | 8/2006 | Stolte |
| 7,124,071 B2 | 10/2006 | Rich |
| 7,124,164 B1 | 10/2006 | Chemtob |
| 7,139,792 B1 | 11/2006 | Mishra |
| 7,143,409 B2 | 11/2006 | Herrero |
| 7,159,217 B2 | 1/2007 | Pulsipher |
| 7,185,067 B1 * | 2/2007 | Viswanath .......... H04W 28/088 709/219 |
| 7,192,352 B2 | 3/2007 | Walker |
| 7,209,137 B2 | 4/2007 | Brokenshire |
| 7,230,616 B2 | 6/2007 | Taubin |
| 7,240,093 B1 | 7/2007 | Danieli |
| 7,249,123 B2 | 7/2007 | Elder |
| 7,263,511 B2 | 8/2007 | Bodin |
| 7,278,108 B2 | 10/2007 | Duarte |
| 7,287,053 B2 | 10/2007 | Bodin |
| 7,292,870 B2 | 11/2007 | Heredia |
| 7,305,438 B2 | 12/2007 | Christensen |
| 7,308,476 B2 | 12/2007 | Mannaru |
| 7,314,411 B2 | 1/2008 | Lannert |
| 7,328,242 B1 | 2/2008 | McCarthy |
| 7,353,295 B1 | 4/2008 | Crow |
| 7,376,474 B2 | 5/2008 | Graepel |
| 7,383,307 B2 | 6/2008 | Kirkland |
| 7,404,149 B2 | 7/2008 | Fox |
| 7,426,538 B2 | 9/2008 | Bodin |
| 7,427,980 B1 | 9/2008 | Partridge |
| 7,428,588 B2 | 9/2008 | Berstis |
| 7,429,987 B2 | 9/2008 | Leah |
| 7,436,407 B2 | 10/2008 | Doi |
| 7,439,975 B2 | 10/2008 | Hsu |
| 7,443,393 B2 | 10/2008 | Shen |
| 7,447,996 B1 | 11/2008 | Cox |
| 7,467,180 B2 | 12/2008 | Kaufman |
| 7,467,181 B2 | 12/2008 | McGowan |
| 7,475,354 B2 | 1/2009 | Guido |
| 7,478,127 B2 | 1/2009 | Creamer |
| 7,484,012 B2 | 1/2009 | Hinton |
| 7,503,007 B2 | 3/2009 | Goodman |
| 7,506,264 B2 | 3/2009 | Polan |
| 7,509,388 B2 | 3/2009 | Allen |
| 7,515,136 B1 | 4/2009 | Kanevsky |
| 7,525,964 B2 | 4/2009 | Astley |
| 7,527,191 B2 | 5/2009 | Takayama |
| 7,552,177 B2 | 6/2009 | Kessen |
| 7,565,650 B2 | 7/2009 | Bhogal |
| 7,571,224 B2 | 8/2009 | Childress |
| 7,571,389 B2 | 8/2009 | Broussard |
| 7,580,888 B2 | 8/2009 | Ur |
| 7,590,984 B2 | 9/2009 | Kaufman |
| 7,596,596 B2 | 9/2009 | Chen |
| 7,614,955 B2 | 11/2009 | Farnham |
| 7,617,283 B2 | 11/2009 | Aaron |
| 7,640,587 B2 | 12/2009 | Fox |
| 7,667,701 B2 | 2/2010 | Leah |
| 7,677,970 B2 | 3/2010 | O'Kelley, II |
| 7,698,656 B2 | 4/2010 | Srivastava |
| 7,702,730 B2 | 4/2010 | Spataro |
| 7,702,784 B2 | 4/2010 | Berstis |
| 7,714,867 B2 | 5/2010 | Doi |
| 7,719,532 B2 | 5/2010 | Schardt |
| 7,719,535 B2 | 5/2010 | Tadokoro |
| 7,734,691 B2 | 6/2010 | Creamer |
| 7,737,969 B2 | 6/2010 | Shen |
| 7,743,095 B2 | 6/2010 | Goldberg |
| 7,747,679 B2 | 6/2010 | Galvin |
| 7,765,478 B2 | 7/2010 | Reed |
| 7,768,514 B2 | 8/2010 | Pagan |
| 7,770,114 B2 | 8/2010 | Sriprakash |
| 7,773,087 B2 | 8/2010 | Fowler |
| 7,774,407 B2 | 8/2010 | Daly |
| 7,780,525 B2 | 8/2010 | Walker |
| 7,782,318 B2 | 8/2010 | Shearer |
| 7,792,263 B2 | 9/2010 | D Amora |
| 7,792,801 B2 | 9/2010 | Hamilton, II |
| 7,796,128 B2 | 9/2010 | Radzikowski |
| 7,808,500 B2 | 10/2010 | Shearer |
| 7,814,152 B2 | 10/2010 | McGowan |
| 7,827,318 B2 | 11/2010 | Hinton |
| 7,843,471 B2 | 11/2010 | Doan |
| 7,844,663 B2 * | 11/2010 | Boutboul ................ G06F 16/27 370/254 |
| 7,844,673 B2 | 11/2010 | Bostick |
| 7,846,024 B2 | 12/2010 | Graepel |
| 7,847,799 B2 | 12/2010 | Taubin |
| 7,853,594 B2 | 12/2010 | Elder |
| 7,856,469 B2 | 12/2010 | Chen |
| 7,865,393 B2 | 1/2011 | Leason |
| 7,873,485 B2 | 1/2011 | Castelli |
| 7,882,222 B2 | 2/2011 | Dolbier |
| 7,882,243 B2 | 2/2011 | Ivory |
| 7,884,819 B2 | 2/2011 | Kuesel |
| 7,886,045 B2 | 2/2011 | Bates |
| 7,890,623 B2 | 2/2011 | Bates |
| 7,893,936 B2 | 2/2011 | Shearer |
| 7,904,829 B2 | 3/2011 | Fox |
| 7,921,128 B2 | 4/2011 | Hamilton, II |
| 7,940,265 B2 | 5/2011 | Brown |
| 7,945,620 B2 | 5/2011 | Bou-Ghannam |

(56) References Cited

U.S. PATENT DOCUMENTS

| | | | | |
|---|---|---|---|---|
| 7,945,802 | B2 | 5/2011 | Hamilton, II | |
| 7,955,171 | B2 | 6/2011 | Jorasch | |
| 7,970,837 | B2 | 6/2011 | Lyle | |
| 7,970,840 | B2 * | 6/2011 | Cannon | G06Q 10/00 709/204 |
| 7,985,132 | B2 | 7/2011 | Walker | |
| 7,985,138 | B2 | 7/2011 | Acharya | |
| 7,990,387 | B2 | 8/2011 | Hamilton, II | |
| 7,996,164 | B2 * | 8/2011 | Hamilton, II | A63F 13/30 702/62 |
| 7,997,987 | B2 | 8/2011 | Johnson | |
| 8,001,161 | B2 | 8/2011 | George | |
| 8,004,518 | B2 | 8/2011 | Fowler | |
| 8,005,025 | B2 | 8/2011 | Bodin | |
| 8,006,182 | B2 | 8/2011 | Bates | |
| 8,013,861 | B2 | 9/2011 | Hamilton, II | |
| 8,018,453 | B2 | 9/2011 | Fowler | |
| 8,018,462 | B2 | 9/2011 | Bhogal | |
| 8,019,797 | B2 | 9/2011 | Hamilton, II | |
| 8,019,858 | B2 * | 9/2011 | Bauchot | G09B 5/12 709/224 |
| 8,022,948 | B2 | 9/2011 | Garbow | |
| 8,022,950 | B2 | 9/2011 | Brown | |
| 8,026,913 | B2 | 9/2011 | Garbow | |
| 8,028,021 | B2 | 9/2011 | Reisinger | |
| 8,028,022 | B2 | 9/2011 | Brownholtz | |
| 8,037,416 | B2 | 10/2011 | Bates | |
| 8,041,614 | B2 | 10/2011 | Bhogal | |
| 8,046,700 | B2 | 10/2011 | Bates | |
| 8,051,462 | B2 | 11/2011 | Hamilton, II | |
| 8,055,656 | B2 | 11/2011 | Cradick | |
| 8,056,121 | B2 | 11/2011 | Hamilton, II | |
| 8,057,307 | B2 | 11/2011 | Berstis | |
| 8,062,130 | B2 | 11/2011 | Smith | |
| 8,063,905 | B2 | 11/2011 | Brown | |
| 8,070,601 | B2 | 12/2011 | Acharya | |
| 8,082,245 | B2 | 12/2011 | Bates | |
| 8,085,267 | B2 | 12/2011 | Brown | |
| 8,089,481 | B2 | 1/2012 | Shearer | |
| 8,092,288 | B2 | 1/2012 | Theis | |
| 8,095,881 | B2 | 1/2012 | Reisinger | |
| 8,099,338 | B2 | 1/2012 | Betzler | |
| 8,099,668 | B2 | 1/2012 | Garbow | |
| 8,102,334 | B2 | 1/2012 | Brown | |
| 8,103,640 | B2 | 1/2012 | Lo | |
| 8,103,959 | B2 | 1/2012 | Cannon | |
| 8,105,165 | B2 | 1/2012 | Karstens | |
| 8,108,774 | B2 | 1/2012 | Finn | |
| 8,113,959 | B2 | 2/2012 | De Judicibus | |
| 8,117,551 | B2 | 2/2012 | Cheng | |
| 8,125,485 | B2 | 2/2012 | Brown | |
| 8,127,235 | B2 | 2/2012 | Haggar | |
| 8,127,236 | B2 | 2/2012 | Hamilton, II | |
| 8,128,487 | B2 | 3/2012 | Hamilton, II | |
| 8,131,740 | B2 | 3/2012 | Cradick | |
| 8,132,235 | B2 | 3/2012 | Bussani | |
| 8,134,560 | B2 | 3/2012 | Bates | |
| 8,139,060 | B2 | 3/2012 | Brown | |
| 8,139,780 | B2 | 3/2012 | Shearer | |
| 8,140,340 | B2 | 3/2012 | Bhogal | |
| 8,140,620 | B2 | 3/2012 | Creamer | |
| 8,140,978 | B2 | 3/2012 | Betzler | |
| 8,140,982 | B2 | 3/2012 | Hamilton, II | |
| 8,145,676 | B2 | 3/2012 | Bhogal | |
| 8,145,725 | B2 | 3/2012 | Dawson | |
| 8,149,241 | B2 | 4/2012 | Do | |
| 8,151,191 | B2 | 4/2012 | Nicol, II | |
| 8,156,184 | B2 | 4/2012 | Kurata | |
| 8,165,350 | B2 | 4/2012 | Fuhrmann | |
| 8,171,407 | B2 | 5/2012 | Huang | |
| 8,171,408 | B2 | 5/2012 | Dawson | |
| 8,171,559 | B2 | 5/2012 | Hamilton, II | |
| 8,174,541 | B2 | 5/2012 | Greene | |
| 8,176,421 | B2 | 5/2012 | Dawson | |
| 8,176,422 | B2 | 5/2012 | Bergman | |
| 8,184,092 | B2 | 5/2012 | Cox | |
| 8,184,116 | B2 | 5/2012 | Finn | |
| 8,185,450 | B2 | 5/2012 | McVey | |
| 8,185,829 | B2 | 5/2012 | Cannon | |
| 8,187,067 | B2 | 5/2012 | Hamilton, II | |
| 8,199,145 | B2 * | 6/2012 | Hamilton, II | G06Q 50/06 705/412 |
| 8,203,561 | B2 | 6/2012 | Carter | |
| 8,214,335 | B2 | 7/2012 | Hamilton, II | |
| 8,214,433 | B2 | 7/2012 | Dawson | |
| 8,214,750 | B2 * | 7/2012 | Hamilton, II | H04N 21/2405 715/848 |
| 8,214,751 | B2 | 7/2012 | Dawson | |
| 8,217,953 | B2 | 7/2012 | Comparan | |
| 8,219,616 | B2 | 7/2012 | Dawson | |
| 8,230,045 | B2 | 7/2012 | Kawachiya | |
| 8,230,338 | B2 | 7/2012 | Dugan | |
| 8,233,005 | B2 | 7/2012 | Finn | |
| 8,234,234 | B2 | 7/2012 | Shearer | |
| 8,234,579 | B2 | 7/2012 | Do | |
| 8,239,775 | B2 * | 8/2012 | Beverland | G06T 19/00 715/848 |
| 8,241,131 | B2 | 8/2012 | Bhogal | |
| 8,245,241 | B2 | 8/2012 | Hamilton, II | |
| 8,245,283 | B2 | 8/2012 | Dawson | |
| 8,265,253 | B2 | 9/2012 | D Amora | |
| 8,310,497 | B2 | 11/2012 | Comparan | |
| 8,313,364 | B2 | 11/2012 | Reynolds | |
| 8,334,871 | B2 | 12/2012 | Hamilton, II | |
| 8,360,886 | B2 | 1/2013 | Karstens | |
| 8,364,804 | B2 | 1/2013 | Childress | |
| 8,425,326 | B2 | 4/2013 | Chudley | |
| 8,442,946 | B2 | 5/2013 | Hamilton, II | |
| 8,489,925 | B1 | 7/2013 | Antukh | |
| 8,496,531 | B2 | 7/2013 | Youm | |
| 8,506,372 | B2 | 8/2013 | Chudley | |
| 8,514,249 | B2 | 8/2013 | Hamilton, II | |
| 8,554,841 | B2 | 10/2013 | Kurata | |
| 8,607,142 | B2 | 12/2013 | Bergman | |
| 8,607,356 | B2 | 12/2013 | Hamilton, II | |
| 8,624,903 | B2 | 1/2014 | Hamilton, II | |
| 8,626,836 | B2 | 1/2014 | Dawson | |
| 8,692,835 | B2 | 4/2014 | Hamilton, II | |
| 8,696,465 | B2 * | 4/2014 | Gatto | G07F 17/323 463/25 |
| 8,721,412 | B2 | 5/2014 | Chudley | |
| 8,827,816 | B2 | 9/2014 | Bhogal | |
| 8,838,640 | B2 | 9/2014 | Bates | |
| 8,849,917 | B2 | 9/2014 | Dawson | |
| 8,911,296 | B2 | 12/2014 | Chudley | |
| 8,992,316 | B2 | 3/2015 | Smith | |
| 9,083,654 | B2 | 7/2015 | Dawson | |
| 9,152,914 | B2 | 10/2015 | Haggar | |
| 9,205,328 | B2 | 12/2015 | Bansi | |
| 9,286,731 | B2 | 3/2016 | Hamilton, II | |
| 9,299,080 | B2 | 3/2016 | Dawson | |
| 9,364,746 | B2 | 6/2016 | Chudley | |
| 9,525,746 | B2 | 12/2016 | Bates | |
| 9,583,109 | B2 | 2/2017 | Kurata | |
| 9,682,324 | B2 | 6/2017 | Bansi | |
| 9,764,244 | B2 | 9/2017 | Bansi | |
| 9,789,406 | B2 | 10/2017 | Marr | |
| 9,795,887 | B2 | 10/2017 | Lin | |
| 9,808,722 | B2 | 11/2017 | Kawachiya | |
| 9,827,488 | B2 | 11/2017 | Pearce | |
| 9,942,013 | B2 | 4/2018 | Malladi | |
| 10,118,099 | B2 | 11/2018 | Condrey | |
| 10,402,731 | B1 | 9/2019 | Cosic | |
| 2001/0025253 | A1 | 9/2001 | Heintz | |
| 2001/0032240 | A1 | 10/2001 | Malone | |
| 2001/0049301 | A1 | 12/2001 | Masuda | |
| 2002/0002514 | A1 | 1/2002 | Kamachi | |
| 2002/0007319 | A1 | 1/2002 | Yu | |
| 2002/0026388 | A1 | 2/2002 | Roebuck | |
| 2002/0035480 | A1 | 3/2002 | Gordon | |
| 2002/0035593 | A1 | 3/2002 | Salim | |
| 2002/0043568 | A1 | 4/2002 | Hess | |
| 2002/0065870 | A1 | 5/2002 | Baehr-Jones | |
| 2002/0090995 | A1 | 7/2002 | Haga | |

(56) References Cited

U.S. PATENT DOCUMENTS

| | | |
|---|---|---|
| 2002/0095586 A1 | 7/2002 | Doyle |
| 2002/0096831 A1 | 7/2002 | Nakayama |
| 2002/0097856 A1 | 7/2002 | Wullert |
| 2002/0116466 A1 | 8/2002 | Trevithick |
| 2002/0124137 A1 | 9/2002 | Ulrich |
| 2002/0130904 A1 | 9/2002 | Becker |
| 2002/0135618 A1 | 9/2002 | Maes |
| 2002/0169665 A1 | 11/2002 | Hughes |
| 2002/0184373 A1 | 12/2002 | Maes |
| 2002/0184391 A1 | 12/2002 | Phillips |
| 2002/0188688 A1 | 12/2002 | Bice |
| 2003/0008712 A1 | 1/2003 | Poulin |
| 2003/0014297 A1 | 1/2003 | Kaufman |
| 2003/0032476 A1 | 2/2003 | Walker |
| 2003/0050977 A1 | 3/2003 | Puthenkulam |
| 2003/0055892 A1 | 3/2003 | Huitema |
| 2003/0056002 A1 | 3/2003 | Trethewey |
| 2003/0076353 A1 | 4/2003 | Blackstock |
| 2003/0101343 A1 | 5/2003 | Eaton |
| 2003/0112952 A1 | 6/2003 | Brown |
| 2003/0135621 A1 | 7/2003 | Romagnoli |
| 2003/0141977 A1 | 7/2003 | Brown |
| 2003/0145128 A1 | 7/2003 | Baird |
| 2003/0149675 A1 | 8/2003 | Ansari |
| 2003/0158827 A1 | 8/2003 | Ansari |
| 2003/0177187 A1 | 9/2003 | Levine |
| 2003/0195957 A1 | 10/2003 | Banginwar |
| 2003/0210265 A1 | 11/2003 | Haimberg |
| 2004/0014514 A1 | 1/2004 | Yacenda |
| 2004/0054667 A1 | 3/2004 | Kake |
| 2004/0059781 A1 | 3/2004 | Yoakum |
| 2004/0078432 A1 | 4/2004 | Manber |
| 2004/0078596 A1 | 4/2004 | Kent |
| 2004/0088303 A1 | 5/2004 | Elder |
| 2004/0097287 A1 | 5/2004 | Postrel |
| 2004/0103079 A1 | 5/2004 | Tokusho |
| 2004/0113756 A1 | 6/2004 | Mollenkopf |
| 2004/0127277 A1 | 7/2004 | Walker |
| 2004/0128181 A1 | 7/2004 | Zurko |
| 2004/0172339 A1 | 9/2004 | Snelgrove |
| 2004/0174392 A1 | 9/2004 | Bjoernsen |
| 2004/0186886 A1 | 9/2004 | Galli et al. |
| 2004/0205134 A1 | 10/2004 | Digate |
| 2004/0210627 A1 | 10/2004 | Kroening |
| 2004/0228291 A1 | 11/2004 | Huslak |
| 2004/0244006 A1 | 12/2004 | Kaufman |
| 2004/0260771 A1 | 12/2004 | Gusler et al. |
| 2005/0015571 A1 | 1/2005 | Kaufman |
| 2005/0021484 A1 | 1/2005 | Bodin |
| 2005/0027696 A1 | 2/2005 | Swaminathan |
| 2005/0043097 A1 | 2/2005 | March |
| 2005/0050137 A1 | 3/2005 | Bodin |
| 2005/0060368 A1 | 3/2005 | Wang |
| 2005/0071428 A1 | 3/2005 | Khakoo |
| 2005/0071462 A1 | 3/2005 | Bodin |
| 2005/0080859 A1 | 4/2005 | Lake |
| 2005/0085296 A1 | 4/2005 | Gelb |
| 2005/0091380 A1 | 4/2005 | Gonen |
| 2005/0097440 A1 | 5/2005 | Lusk |
| 2005/0113164 A1 | 5/2005 | Buecheler |
| 2005/0132009 A1 | 6/2005 | Solie |
| 2005/0138108 A1 | 6/2005 | Galvin |
| 2005/0149620 A1 | 7/2005 | Kirkland |
| 2005/0161878 A1 | 7/2005 | Nally |
| 2005/0165893 A1 | 7/2005 | Feinberg |
| 2005/0216346 A1 | 9/2005 | Kusumoto |
| 2005/0223075 A1 | 10/2005 | Swearingen et al. |
| 2005/0246711 A1 | 11/2005 | Berstis |
| 2005/0277472 A1 | 12/2005 | Gillan |
| 2006/0003305 A1 | 1/2006 | Kelmar |
| 2006/0004659 A1 | 1/2006 | Hutchison |
| 2006/0026253 A1 | 2/2006 | Kessen |
| 2006/0031322 A1 | 2/2006 | Kessen |
| 2006/0031326 A1 | 2/2006 | Ovenden |
| 2006/0036688 A1 | 2/2006 | McMahan |
| 2006/0080702 A1 | 4/2006 | Diez |
| 2006/0121990 A1 | 6/2006 | O'Kelley |
| 2006/0128460 A1 | 6/2006 | Muir |
| 2006/0129643 A1 | 6/2006 | Nielson |
| 2006/0155813 A1 | 7/2006 | Dietz et al. |
| 2006/0160589 A1 | 7/2006 | Okada |
| 2006/0161852 A1 | 7/2006 | Chen |
| 2006/0178968 A1 | 8/2006 | Jung |
| 2006/0184260 A1 | 8/2006 | Graepel |
| 2006/0190591 A1 | 8/2006 | Bobde |
| 2006/0252526 A1 | 11/2006 | Walker |
| 2006/0258463 A1 | 11/2006 | Cugno |
| 2007/0026934 A1 | 2/2007 | Herbrich |
| 2007/0066403 A1 | 3/2007 | Conkwright |
| 2007/0073582 A1 | 3/2007 | Jung |
| 2007/0087799 A1 | 4/2007 | Van Luchene |
| 2007/0106526 A1 | 5/2007 | Jung |
| 2007/0111789 A1 | 5/2007 | Van Deursen |
| 2007/0112624 A1 | 5/2007 | Jung |
| 2007/0112706 A1 | 5/2007 | Herbrich |
| 2007/0117623 A1 | 5/2007 | Nelson |
| 2007/0117636 A1 | 5/2007 | Takahashi |
| 2007/0130001 A1 | 6/2007 | Jung |
| 2007/0168444 A1 | 7/2007 | Chen |
| 2007/0168447 A1 | 7/2007 | Chen |
| 2007/0173323 A1 | 7/2007 | Johnson |
| 2007/0180040 A1 | 8/2007 | Etgen |
| 2007/0218997 A1 | 9/2007 | Cho |
| 2007/0260567 A1 | 11/2007 | Funge |
| 2007/0265718 A1 | 11/2007 | Graepel |
| 2007/0281285 A1 | 12/2007 | Jayaweera |
| 2007/0298867 A1 | 12/2007 | Huang |
| 2008/0019353 A1 | 1/2008 | Foote |
| 2008/0059304 A1 | 3/2008 | Kimsey |
| 2008/0064467 A1 | 3/2008 | Reiner |
| 2008/0113815 A1 | 5/2008 | Weingardt |
| 2008/0120558 A1 | 5/2008 | Nathan |
| 2008/0126350 A1 | 5/2008 | Shoemaker |
| 2008/0155019 A1 | 6/2008 | Wallace |
| 2008/0176655 A1 | 7/2008 | James |
| 2008/0207329 A1 | 8/2008 | Wallace |
| 2008/0214287 A1* | 9/2008 | Lutnick ............ A63F 13/35 463/25 |
| 2008/0242420 A1 | 10/2008 | Graepel |
| 2008/0254893 A1 | 10/2008 | Patel |
| 2008/0268943 A1 | 10/2008 | Jacob |
| 2008/0270605 A1 | 10/2008 | Berstis |
| 2008/0270916 A1 | 10/2008 | Chen |
| 2008/0274805 A1 | 11/2008 | Ganz |
| 2008/0301405 A1 | 12/2008 | Kaufman |
| 2009/0005172 A1 | 1/2009 | Shibahara |
| 2009/0075738 A1 | 3/2009 | Pearce |
| 2009/0088233 A1 | 4/2009 | O'Rourke |
| 2009/0113448 A1 | 4/2009 | Smith |
| 2009/0118006 A1 | 5/2009 | Kelly |
| 2009/0137320 A1* | 5/2009 | Kimura ............ H04L 67/1078 463/42 |
| 2009/0209335 A1 | 8/2009 | Pearce |
| 2009/0253494 A1 | 10/2009 | Fitch |
| 2009/0280909 A1 | 11/2009 | McEniry |
| 2009/0318223 A1 | 12/2009 | Langridge |
| 2009/0325711 A1 | 12/2009 | Bronstein |
| 2010/0131864 A1 | 5/2010 | Bokor |
| 2010/0169800 A1 | 7/2010 | Lance |
| 2010/0173701 A1 | 7/2010 | Van Luchene |
| 2010/0173713 A1 | 7/2010 | Van Luchene |
| 2010/0203963 A1 | 8/2010 | Allen |
| 2010/0267450 A1 | 10/2010 | McMain |
| 2010/0304839 A1 | 12/2010 | Johnson |
| 2010/0306672 A1 | 12/2010 | Mceniry |
| 2010/0312995 A1* | 12/2010 | Sung ................ G06N 3/006 715/757 |
| 2011/0092279 A1 | 4/2011 | Pilip |
| 2011/0131085 A1 | 6/2011 | Wey |
| 2011/0190063 A1 | 8/2011 | Kajii |
| 2011/0212762 A1 | 9/2011 | Ocko |
| 2012/0009997 A1 | 1/2012 | Youm |
| 2012/0010734 A1 | 1/2012 | Youm |
| 2012/0015736 A1 | 1/2012 | Vanbragt |

(56) References Cited

U.S. PATENT DOCUMENTS

| | | | |
|---|---|---|---|
| 2012/0021823 A1 | 1/2012 | Youm | |
| 2012/0021825 A1* | 1/2012 | Harp | A63F 13/12 463/30 |
| 2012/0064968 A1 | 3/2012 | Youm | |
| 2012/0094751 A1 | 4/2012 | Reynolds | |
| 2012/0122552 A1 | 5/2012 | Youm | |
| 2012/0190456 A1 | 7/2012 | Rogers | |
| 2012/0315993 A1 | 12/2012 | Dumont | |
| 2013/0225260 A1 | 8/2013 | Cudak | |
| 2013/0252737 A1 | 9/2013 | Mescon | |
| 2013/0260876 A1 | 10/2013 | Margalith | |
| 2013/0266927 A1 | 10/2013 | Mann | |
| 2013/0296046 A1 | 11/2013 | Mianji | |
| 2014/0004955 A1 | 1/2014 | Nahari | |
| 2014/0004960 A1 | 1/2014 | Soti | |
| 2014/0011595 A1 | 1/2014 | Muller | |
| 2014/0024445 A1 | 1/2014 | Aller | |
| 2014/0162763 A1 | 6/2014 | Kim | |
| 2014/0162781 A1 | 6/2014 | Butler | |
| 2014/0274402 A1 | 9/2014 | Michel | |
| 2014/0342808 A1* | 11/2014 | Chowdhary | A63F 13/493 463/24 |
| 2014/0344725 A1 | 11/2014 | Bates | |
| 2014/0349753 A1 | 11/2014 | Lmai | |
| 2015/0031426 A1 | 1/2015 | Alloway | |
| 2015/0038233 A1 | 2/2015 | Rom | |
| 2015/0051000 A1 | 2/2015 | Henn | |
| 2015/0310698 A1 | 10/2015 | Polis | |
| 2016/0001181 A1 | 1/2016 | Marr | |
| 2016/0001182 A1 | 1/2016 | Marr | |
| 2016/0001186 A1 | 1/2016 | Marr | |
| 2016/0005270 A1 | 1/2016 | Marr | |
| 2016/0067611 A1 | 3/2016 | Ware | |
| 2016/0067612 A1 | 3/2016 | Ntoulas | |
| 2016/0166935 A1 | 6/2016 | Condrey | |
| 2016/0191671 A1 | 6/2016 | Dawson | |
| 2016/0296840 A1* | 10/2016 | Kaewell | H04L 65/762 |
| 2017/0206797 A1 | 7/2017 | Solomon | |
| 2017/0279719 A1* | 9/2017 | Faith | H04L 67/1001 |
| 2018/0169515 A1 | 6/2018 | Rice | |
| 2018/0280806 A1 | 10/2018 | Otomo | |
| 2018/0308473 A1 | 10/2018 | Scholar | |
| 2019/0043239 A1 | 2/2019 | Goel | |
| 2019/0081848 A1 | 3/2019 | Zou | |
| 2019/0118078 A1 | 4/2019 | Li | |
| 2019/0126150 A1 | 5/2019 | Tartaj | |
| 2019/0164007 A1 | 5/2019 | Liu | |
| 2019/0184286 A1 | 6/2019 | Du | |
| 2019/0197402 A1 | 6/2019 | Kovács | |
| 2019/0205727 A1 | 7/2019 | Lin | |
| 2019/0295306 A1 | 9/2019 | Weston | |
| 2019/0340419 A1 | 11/2019 | Milman | |
| 2020/0122038 A1 | 4/2020 | Ebrahimi | |
| 2020/0122040 A1 | 4/2020 | Juliani, Jr. | |
| 2020/0145615 A1 | 5/2020 | Seko | |
| 2020/0372400 A1 | 11/2020 | Carreira-Perpiñán | |
| 2020/0401576 A1 | 12/2020 | Yerli | |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0627728 B1 | 9/2000 |
| EP | 0717337 B1 | 8/2001 |
| EP | 1207694 A2 | 5/2002 |
| EP | 1209849 A2 | 5/2002 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 2339938 | 10/2002 |
| GB | 2352154 | 7/2003 |
| JP | H11191097 A | 4/1999 |
| JP | 11191097 | 7/1999 |
| JP | 3033956 B2 | 4/2000 |
| JP | 3124916 B2 | 1/2001 |
| JP | 2001119403 A | 4/2001 |
| JP | 3177221 B2 | 6/2001 |
| JP | 2001204973 A | 7/2001 |
| JP | 3199231 B2 | 8/2001 |
| JP | 2001230883 A | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 2004062539 A | 2/2004 |
| JP | 3575598 | 7/2004 |
| JP | 3579823 B | 7/2004 |
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5550720 B2 | 7/2014 |
| JP | 2015002839 A | 1/2015 |
| JP | 5734566 B2 | 6/2015 |
| KR | 20020038229 A | 5/2002 |
| KR | 20030039019 A | 5/2003 |
| MY | 117864 A | 8/2004 |
| SG | 55396 | 12/1998 |
| TW | 424213 | 3/2001 |
| TW | 527825 | 4/2003 |
| WO | 0060444 A1 | 10/2000 |
| WO | 0062231 A1 | 10/2000 |
| WO | 0137162 A2 | 5/2001 |
| WO | 0201455 A2 | 1/2002 |
| WO | 0203645 A2 | 1/2002 |
| WO | 2002073457 | 9/2002 |
| WO | 20020087156 | 10/2002 |
| WO | 03044755 A1 | 5/2003 |
| WO | 03049459 A1 | 6/2003 |
| WO | 03058518 A2 | 7/2003 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |

(56) References Cited

FOREIGN PATENT DOCUMENTS

WO      2009104564      8/2009
WO      2010096738 A1      8/2010

OTHER PUBLICATIONS

Hassen et al., "A Task-and Data-Parallel Programming Language Based on Shared Objects," ACM Transactions on Programming Languages and Systems, vol. 20, No. 6, Nov. 1998, pp. 1131-1170.
Y. Zhao et al., "A 3D virtual shopping mall that has the intelligent virtual purchasing guider and cooperative purchasing functionalities", CSCWD 2004—8th International Conference on Computer Supported Cooperative Work in Design—Proceedings, 2004, p. 381-385.
V. Stojanovic, "Virtual boutique—try clothes on-line", 5th International Conference on Telecommunications in Modern Satellite, Cable and Broadcasting Service. TELSIKS 2001. Proceedings of Papers (Cat. No. 01EX517), 2001, pt. 2, p. 802-3 vol.2.
Kautz, H., B. Selman, M. Shah . . . "Referral Web: Combining Social Networks and Collaborative Filtering". Communications of the ACM, vol. 40, No. 3, Mar. 1997.
Schwartz, M. F., D. C. M. Wood. "Discovering shared interests among people using graph analysis of global electronic mail traffic". Department of Computer Science, University of Colorado, Boulder CO. Oct. 1992.
Wellman, B. "For a social network analysis of computer networks: a sociological perspective on collaborative work and virtual community". Proceedings of the 1996 conference on ACM SIGCPR/SIGMIS. 1-11.
Qureshi, S. "Supporting electronic group processes: a social perspective". Proceedings of the 1995 ACM SIGCPR Conference on Supporting teams, groups, and learning inside the IS function. ACM Press. 24-34.
Ackerman, M.S., B. Starr. "Social activity indicators: interface components for CSCW systems". Proceedings of the 8th ACM Symposium on User Interface and Software Technology. ACM Press. 159-168, Nov. 14-17, 1995.
Garton, L., C. Haythornthwaite, B. Wellman. "Studying on-line social networks in Doing Internet Research", Jun. 1997.
Srivastava, Jaidepp, Robert Cooley, Mukund Deshpande, Pang-Ning Tan. "Web Usage Mining: Discovery and Applications of Usage Patterns from Web Data". SIGKDD Explorations, vol. 1, Issue 2. Jan. 2000. 12-23.
Wang, Y. "Web Mining and Knowledge Discovery of Usage Patterns". CS748T Project (Part I) Feb. 2000.
Sack, W. "Conversation Map: a content-based Usenet newsgroup browser". Proceedings of the 2000 International Conference on Intelligent User Interfaces. ACM Press. 233-240.
Feldman, R. "Mining unstructured data". Tutorial notes for Ack Sigkdd 1999. ACM Press. 182-236.
IBM developer Works, OptimalGrid—autonomic computing on the Grid, James H. Kaufman; Tobin J. Lehman; Glenn Deen; and John Thomas, Jun. 2003.
IBM, Transcoding: Extending e-business to new environments, Britton et al., Sep. 22, 2000.
Duong et al; "A dynamic load sharing algorithm for massivly multiplayer online games" published Sep. 28, 2003-Oct. 1, 2003. http://ieeexplore.ieee.org/iel5/8945/28322/01266179.pdf?tp=&arnumber-=1266179&isnumber=28322http://ieeexplore.ieee.org/xpl/absprintf.jsp?arnumb-er=1266179.
"A multi-server architecture for distributed virtual walkthrough" http://delivery.acm.org/10.1145/590000/585768/p163-ng.pdf?key1=585768&key-2=0554824911&coll=GUIDE&dl=GUIDE&CFID=41712537&CFTOKEN=50783297. Nov. 11, 2002.
Mauve, M., Fischer, S., and Widmer, J. 2002. A generic proxy system for networked computer games. In Proceedings of the 1st Workshop on Network and System Support for Games (Braunschweig, Germany, Apr. 16-17, 2002). NetGames '02. ACM, New York, NY, 25-28. DOI= http://doi.acm.org/10.1145/566500.566504.
Lee et al., "A Self-Adjusting Data Distribution Mechanism for Multidimensional Load Balancing in Multiprocessor-Based Database Systems," Information Systems vol. 19, No. 7, pp. 549-567, 1994.
Feng et al., "A Parallel Hierarchical Radiosity Algorithm for Complex Scenes," Proceedings IEEE Symposium on Parallel Rendering (PRS) '97), IEEE Computer Society Technical Committee on Computer Graphics in cooperation with ACM SIGGRAPH pp. 71-79, 1997.
Andert, "A Simulation of Dynamic Task Allocation in a Distributed Computer System," Proceedings of the 1987 Winter Simulation Conference, 1987, pp. 1-9.
Roaming Virtual World Is a Real Trip; [Final Edition] Leslie Walker. The Washington Post. Washington, D.C.: Mar. 30, 2006.
E-Entrepreneurship: Learning in a Simulated Environment Salim Jiwa, Dawn Lavelle, Arjun Rose. Journal of Electronic Commerce in Organizations. Hershey: Jul.-Sep. 2005. vol. 3, Iss. 3.
"Universally Unique Identifier", 2006 (http://en.wikipedia.org/wiki/UUID).
K. Loesing et al., "Privacy-aware presence management in instant messaging systems", Distributed & Mobile Syst. Group, Otto-Friedrich-Univ. Germany, Proceedings. 20th International Parallel and Distributed Processing Symposium Rhodes Island, Greece; (IEEE Cat. No. 06TH8860), 2006, 8 pp.
International Search Report as Published as WO2005/079538 in corresponding international application No. PCT/US2005/005550, dated Jul. 5, 2006.

\* cited by examiner

METHODS AND SYSTEMS FOR CONTINUING TO EXECUTE A SIMULATION AFTER PROCESSING RESOURCES GO OFFLINE

CROSS-REFERENCE TO RELATED APPLICATIONS

This application is a continuation application of U.S. patent application Ser. No. 16/397,741, entitled "Systems and Methods for Distributing the Generation of Nonplayer Characters Across Networked End User Devices for Use in Simulated NPC Gameplay Sessions" and filed on Apr. 29, 2019, which is a continuation application of U.S. patent application Ser. No. 14/712,359, entitled "System and Method for Simulating Gameplay of Nonplayer Characters Distributed Across Networked End User Devices", filed on May 14, 2015, and issued as U.S. Pat. No. 10,315,113 on Jun. 11, 2019, both of which are hereby incorporated herein by reference in their entirety.

FIELD OF THE INVENTION

The invention relates to a system and method of simulating gameplay of non-player characters distributed across networked end user devices.

BACKGROUND OF THE INVENTION

Networked video games have exploded in popularity due, in part, to game hosting services, which include console-based services such as Microsoft's Xbox LIVE®, Sony's PlayStation Network®, and PC-based game hosting services, which enable gamers all over the world to play with or against one another using their end user devices (e.g., consoles, PCs, etc.).

Generally, networked video games involve a host computer (which is typically, though not necessarily, a server device) that provides a gameplay session in which a video game is played at an end user device over a network. Many networked video games involve a multiplayer video game in which two or more players play in a gameplay session in a cooperative or adversarial relationship. At least one of the players may comprise a human player, while one or more other players may comprise either non-player characters (NPCs) and/or other human players.

An NPC may comprise a player not controlled by a human user. For example, an NPC may be controlled by game logic (e.g., artificial intelligence). A game developer or others may design an NPC to perform one or more functions of a human-controlled player. However, testing such designs can be difficult for various reasons. For example, in networked video games, certain real-world factors such as a quality of network connections of end user devices may be difficult to simulate, and therefore take into account when testing an NPC. Furthermore, it can be difficult to simulate coordination of end user devices involved a networked video game.

A related problem includes a difficulty in testing a suitability of an NPC match, in which two or more NPCs are grouped together to play in a cooperative or adversarial relationship. For example, real-world effects of network connections on a given NPC match may be difficult to test. A still further related problem includes a difficulty in debugging new or updated software or hardware components involved in a networked video game. For instance, it may be difficult to troubleshoot or identify problems without real-world data from networked end user devices, and data from actual gameplay of networked video games may be insufficient.

These and other drawbacks exist with networked video games.

SUMMARY OF THE INVENTION

The invention addressing these and other drawbacks relates to a system and method of simulating gameplay of NPCs distributed across networked end user devices. To simulate gameplay of NPCs, the system may identify end user devices (e.g., gaming consoles, personal computers, smartphones, etc.) that are connected to the system through a network and are available to participate in a simulated NPC gameplay session. An end user device may be available to participate when it has sufficient computing capacity, such as when in an inactive (e.g, idle or standby) state, and/or when it otherwise has spare computing capacity that can be used to participate in a simulated NPC gameplay session. As such, the system may leverage spare computing capacity of networked end user devices to conduct a simulated NPC gameplay session.

A simulated NPC gameplay session is one in which one or more NPCs executing at participating end user devices interact with a test game engine over a network to simulate actual gameplay between human players and/or NPCs. The system may facilitate multiple (distinct) simulated NPC gameplay sessions, which may occur simultaneously or at different times. Each simulated NPC gameplay session may use different sets of end user devices that are operated by users to play networked video games. In this manner, the behavior of an NPC may be tested using real-world conditions that may affect gameplay, such as a network connection quality, user-to-user game engine coordination and data exchanges, and/or other real-world conditions.

To facilitate NPC and other testing described herein, the system may provide an NPC specification to each identified end user device, which then uses the NPC specification to instantiate one or more NPCs. For example, an NPC specification may specify NPC behavior (e.g., through a scriptable bot) such that an NPC can execute, without human intervention, on an end user device to which the NPC specification was provided. In this manner, each participating end user device may execute its own set of one or more NPCs, which is specified by the system, so that the system may simulate gameplay of NPCs distributed across networked end user devices.

A test game engine may include some, but not all, functions provided by a production game engine. A production game engine may be used to host networked video games played through one or more end user devices in a production, or non-testing, environment (e.g., Microsoft's Xbox LIVE®, Sony's PlayStation Network®, and PC-based game networks). Generally speaking, the functions provided by a production game engine may include, without limitation, a physics function provided by a physics engine, an artificial intelligence ("AI") function provided by an AI engine, an environmental rendering function provided by an environmental engine, an audio and visual ("A/V") rendering function provided by an A/V rendering engine, a peer-to-peer ("P2P") function provided by a P2P communication engine, and/or other functions.

The test game engine may include a modified version of a production game engine. For example, and without limitation, the test game engine may exclude at least some of the foregoing functions of a production game engine, such as the A/V rendering function and P2P function (although other functions may be alternatively or additionally excluded as well), include a modified or updated version of a function of a production game engine, add at least one function to a production game engine, and/or other include other changes to the production game engine. In this manner, the system may more efficiently simulate gameplay by excluding certain functions that may be unnecessary to execute a simulated NPC gameplay session that may not involve human users. For example, each participating end user device may exclude A/V rendering, reducing the computational load required to participate in the simulated NPC gameplay session.

Leveraging end user devices to control NPCs in a simulated NPC gameplay session may be used in various contexts. For example, the system may provide simulated match data that can be leveraged to match players operated by human users in a production environment (e.g., to determine which human users should be matched to play together), as well as to match NPCs in a production environment (e.g., to determine which NPCs should be matched with other NPCs and/or players operated by human users). In instances where a single end user device is used to test an NPC during a single simulated NPC gameplay session (e.g., without the involvement of other end user devices in the simulated NPC gameplay session), the system may execute a simulation against the server-side service infrastructure without requiring any other NPCs. Doing so may facilitate testing the network against the service infrastructure (or game hosting services networks), or test modifications to a game engine, game content, game configuration, etc.

Additionally, the simulated NPC gameplay sessions may provide information relating to network connections (e.g., the quality of connections: between users in a particular network, between users in a particular geography, between users using a particular Internet Service Provider, relative to time such as time of day, day of week, etc.). Over time, the system may build a mapping of connection strength between end user devices participating in simulated NPC gameplay sessions. Furthermore, the system may be used to test possible connections between various end user devices before the actual real players are matched to play in a production environment.

Furthermore, the simulated NPC gameplay sessions may provide information relating to realistic testing of hardware and/or software related to networked video games. For example, the system may be used to test changes to a game engine (e.g., a test game engine may include one or more updates, such as bug fixes or new features, applied to a production game engine), changes to game configuration files or game content (i.e. without necessarily requiring changes to the "game engine" or client-device executables), and/or other changes that affect the game.

In some instances, a given end user device may participate in a simulated NPC gameplay session (involving one or more NPCs) whether or not the end user device is also involved in a production gameplay session (e.g., one in which a user is playing a game). Furthermore, a given end user device may simultaneously participate in multiple NPC gameplay sessions (each of which may be used to test the same or different changes to the game engine, changes to the game configuration files or game content, etc.).

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

The invention described herein relates to a system and method of simulating gameplay of non-player characters distributed across networked end user devices. The system may identify end user devices that are connected to the system through a network and are available to participate in a simulation in which each participating end user device is provided with one or more NPCs to be executed. An end user device may be available to participate when it has sufficient computing capacity, such as when in an idle or standby state or during "low load" conditions like when a player is waiting in an online lobby or browsing an online marketplace. As such, the system may leverage spare computing capacity of networked end user devices to execute NPCs at networked end user devices during a simulation. In this manner, the behavior of an NPC may be tested using real-world conditions that may affect gameplay, such as a network connection quality, user-to-user game engine coordination and data exchanges, and/or other real-world conditions associated with networked end user devices.

Figure 1:
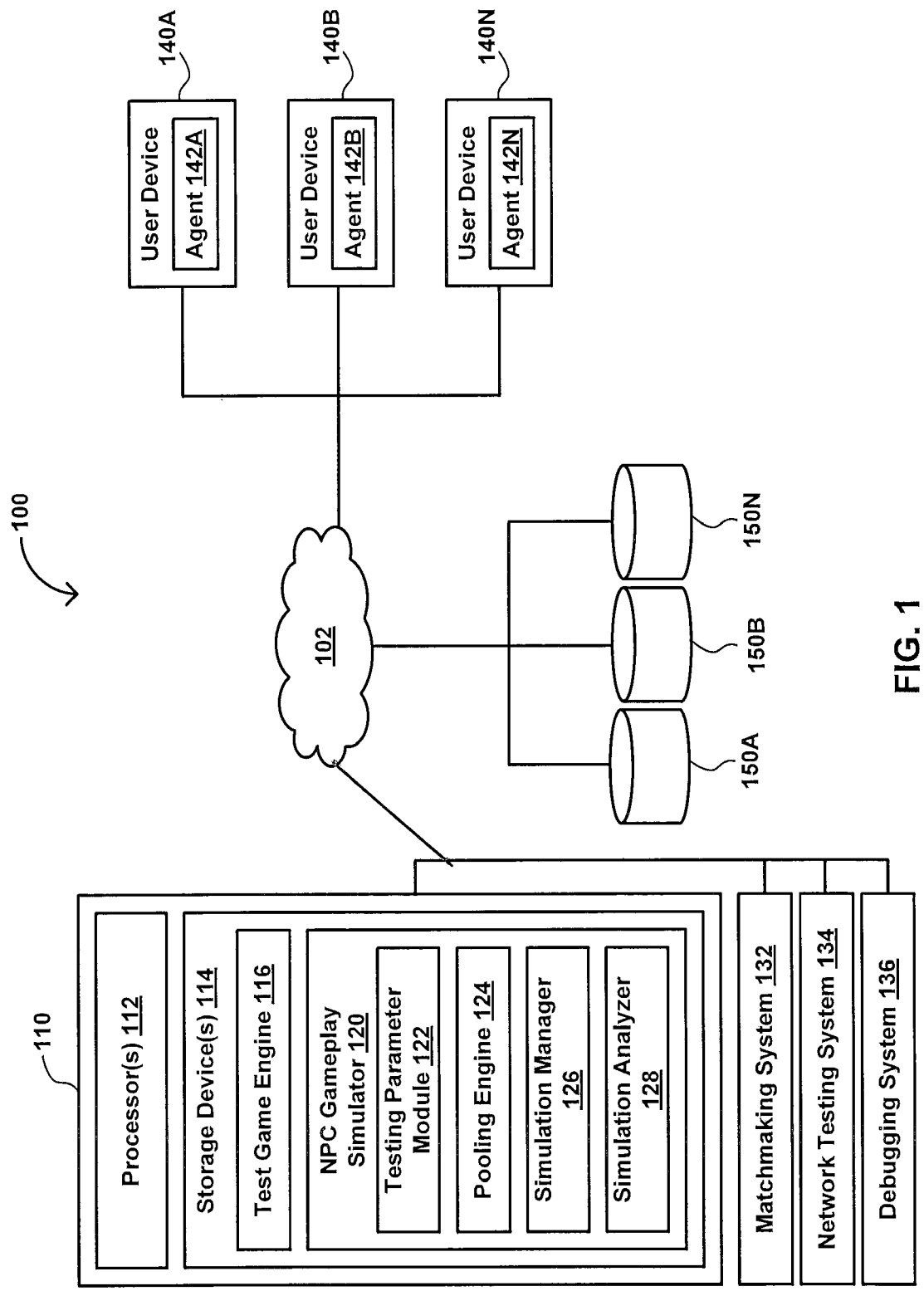
FIG. 1 illustrates an exemplary system for simulating gameplay of non-player characters distributed across networked end user devices, according to an implementation of the invention.

While aspects of the invention may be described herein with reference to various game levels or modes, characters, roles, game items, etc. associated with a First-Person-Shooter (FPS) game, it should be appreciated that any such examples are for illustrative purposes only, and are not intended to be limiting. The system and method described in detail herein may be used in any genre of multiplayer video game, without limitation Exemplary System Architecture FIG. 1 illustrates a system 100 for simulating gameplay of non-player characters distributed across networked end user devices 140, according to one implementation of the invention. In one implementation, system 100 may include a computer system 110, a matchmaking system 132, a network topology system 134, a debugging system 136, one or more end user devices 140 (illustrated as end user devices 140A, 140B, . . . , 140N), one or more databases 150, and/or other components.

Computer System 110

Computer system 110 may be configured as a server (e.g., having one or more server blades, processors, etc.), a gaming console, a handheld gaming device, a personal computer (e.g., a desktop computer, a laptop computer, etc.), a smartphone, a tablet computing device, and/or other device that can be programmed to host simulated gameplay of NPCs across end user devices 140.

Computer system 110 may include one or more processors 112 (also interchangeably referred to herein as processors 112, processor(s) 112, or processor 112 for convenience), one or more storage devices 114 (which may store a test game engine 116 and a NPC gameplay simulator 120), and/or other components. Processors 112 may be programmed by one or more computer program instructions. For example, processors 112 may be programmed by NPC gameplay simulator 120 and/or other instructions (such as test game engine 116).

Test Game Engine

In an implementation, test game engine 116 may include a modified version of a production game engine. For example, a first set of functions provided by a test game engine may be different from a second set of functions provided by the production game engine. Such differences can include, without limitation, an added function, a removed function, a updated or modified function, and/or other changes to the functionality of a production game engine. A production game engine may be used to host networked video games played through one or more end user devices 140 in a production, or non-testing, environment (e.g., Microsoft's Xbox LIVE®, Sony's PlayStation Network®, and PC-based game networks). Generally speaking, the functions provided by a production game engine may include, without limitation, a physics function provided by a physics engine, an AI function provided by an AI engine, an environmental rendering function provided by an environmental engine, an A/V rendering function provided by an A/V rendering engine, a P2P function provided by a P2P communication engine, and/or other functions. It should be noted that a production game engine may be used during one or more simulated NPC gameplay sessions as well.

In one example, test game engine 116 may include a physics engine, an AI engine, and an environmental engine, while excluding an A/V rendering engine and a P2P communication engine. Other functions may be included or excluded as well. In the foregoing example, test game engine 116 may include a minimal set of functionality required to simulate gameplay, while excluding other functions not needed in the context of NPC gameplay simulation (such as audio/visual rendering). In other examples, test game engine 116 may include A/V rendering in order to test the effects of, for example, certain graphical or audio renderings on network latency during gameplay. In still other examples, test game engine 116 may include all (or substantially all) of the functionality of a production game engine, effectively using a production game engine for NPC gameplay simulation.

NPC Gameplay Simulator

NPC gameplay simulator 120 may include instructions that program computer system 110. In general, NPC gameplay simulator 120 may cause a simulated NPC gameplay session to occur. A simulated NPC gameplay session (hereinafter also referred to as "simulation" or "test") is one in which NPCs distributed across (e.g., distributed to and executing at) one or more (typically several) end user devices 140 are simulated to play a networked video game that uses test game engine 116. A simulation may be associated with a discreet goal or time after which the simulation ends (e.g., a capture-the-flag style game between opposing teams of players, conclusion of an in-game sporting event, etc.), continuous gameplay in which no particular terminating goal is provided (e.g., a simulation of a massive multiplayer online game), and/or other types of gameplay that may be simulated. Furthermore, multiple simulations may be run simultaneously, each using different sets of end user devices 140.

The instructions of NPC gameplay simulator 120 may include, without limitation, a simulation parameter module 122, a pooling engine 124, a gameplay initiator 126, a simulation analytics engine 128, and/or other instructions that program computer system 110 to perform various operations, each of which are described in greater detail herein. As used herein, for convenience, the various instructions will be described as performing an operation, when, in fact, the various instructions program the processors 112 (and therefore computer system 110) to perform the operation.

Obtaining a Simulation Specification to Setup a Simulation

In an implementation, simulation parameter module 122 may obtain a simulation specification used to set up a simulation. The simulation specification may include one or more simulation parameters that describe the simulation. For example, and without limitation, the one or more simulation parameters may specify a game level that should be used in the simulation, a game environment, a game difficulty, a number of NPCs (e.g., a number of NPCs that should run at a given end user device 140, a total number of NPCs that should be used, etc.), an NPC characteristic that should be used (e.g., an NPC level of skill, an NPC player role, whether NPCs should be cooperative or adversarial, etc.), a minimum number of end user device 140 that should be used, a set of end user devices 140 that should be used (e.g., based on geography, type of network, Internet Service Provider, whether a wireless or wired connection is used, an identification of a game hosting service, end user device version, or type of Network Address Translation (NAT) connection), one or more servers that should be used to host a simulation, a time-based parameter (e.g., that specifies a date/time in which simulation should be run, a periodicity in which to execute simulations, etc.), a network-based parameter (e.g., that specifies a network latency that should be tested), a version-based parameter (e.g., that specifies a particular version of software or hardware of end user devices 140 that should be tested), and/or other parameters.

The simulation parameter module 122 may obtain the one or more simulation parameters from one or more parties and/or for different purposes. For instance, simulation parameter module 122 may obtain the one or more simulation parameters from a simulation designer (e.g., a human user that specifies simulations), a predefined simulation specification, a matchmaking system 132, a network testing system 134, a debugging system 136, and/or other party.

A simulation designer may design a simulation for NPCs distributed across end user devices 140. The predefined simulation specification may be used to predefine simulation parameters for testing. For example, a simulation designer or others may specify simulation parameters for a simulation and store the simulation parameters in a predefined template. Different sets of predefined simulation specifications may be used for different purposes (e.g., one simulation specification may be used to test during evening hours while another simulation specification may be used to test during morning hours). The simulation parameters and/or predefined simulation specifications may be stored in a simulation parameter database, such as a database 150.

Pooling End User Devices to Participate in Simulated NPC Gameplay

In an implementation, pooling engine 124 may identify one or more end user devices 140 that are available to participate in a simulation. To do so, pooling engine 124 may obtain a listing of end user devices 140 that are accessible through network 102. For example, the listing may include end user devices 140 that have logged onto a production environment to play networked video games. For instance, upon receiving a log on from an end user device 140 to play networked video games, a production environment may store device information associated with the end user device 140. The device information may include, without limitation, identifying information used to identify the device, a current state of the device, a geographic location of the device, a type of network used by the device, an ISP through which the device is connected to the network, whether a wireless or wired connection is used, an identification of a game hosting service, end user device version, or type of Network Address Translation (NAT) connection, and/or other information that describes the device and/or network used by the device. At least some of the device information may be available from other information sources (e.g., a user or device profile) as well.

Pooling engine 124 may determine that a given end user device 140 (among the listing of end user devices) is available to participate in a simulation based on its current state, which may indicate its computing capacity (e.g., processor capacity, memory availability, etc.). An end user device 140 may be available to participate in a simulation when its available computing capacity exceeds a minimum required capacity for participation in the simulation. This may occur, when, for example, a user is waiting a virtual game lobby, the end user device is in a standby or idle state, or the end user device is otherwise in a state in which computing capacity is above the minimum required capacity. The minimum required capacity may be predefined and/or configurable. For instance, a default minimum required capacity may be specified by a simulation parameter. Alternatively or additionally, pooling engine 124 may determine the minimum required capacity based on one or more characteristics of the simulation. The one or more characteristics may include, without limitation, a number of NPCs to run on an end user device 140, a type of gameplay to be simulated, and/or other characteristics.

In some instances, a given end user device 140 may participate in a simulated NPC gameplay session (involving one or more NPCs) whether or not the end user device is also involved in a production gameplay session (e.g., one in which a user is playing a game). Furthermore, a given end user device may simultaneously participate in multiple NPC gameplay sessions (each of which may be used to test the same or different changes to the game engine, changes to the game configuration files or game content, etc.). For example, an NPC specification may specify one or more NPCs to be hosted in a single simulated NPC gameplay session at end user device 140. In another example, an NPC specification may specify different sets of one or more NPCs to be hosted in multiple simulated NPC gameplay sessions at end user device 140. Alternatively or additionally, a given NPC specification may correspond to a single simulated NPC gameplay session such that multiple NPC specifications correspond to multiple simulated NPC gameplay sessions.

In an implementation, pooling engine 124 may target a particular end user device 140 (subject to its availability) to participate in a simulation based on one or more simulation parameters. A particular end user device 140 may be targeted for reasons discussed herein (e.g., to test a network connection used by the device, debug a version of software or hardware executing on the device, to test new content or configurations of the software, etc.).

In an implementation, pooling engine 124 may invite an available end user device 140 to participate in the simulation. For example, pooling engine 124 may transmit, to an available end user device 140, a request to join a simulation. Upon receipt of an acceptance of the invitation, pooling engine 124 may add the available end user device 140 to a pool of available devices. Alternatively, pooling engine 124 may simply add an available end user device 140 to the pool of available devices.

Initiating Simulated NPC Gameplay and Providing NPC Specifications to End User Devices In an implementation, simulation manager 126 may initiate a simulation. A simulation may be triggered on-demand (e.g., based on an input from a human user or other input) and/or periodically according to a schedule. Regardless of the manner in which a simulation is triggered, simulation manager 126 may initiate a simulation when a sufficient number of participating end user devices 140 has been pooled. An end user device 140 is a "participating end user device" when it satisfies any relevant simulation parameter (and has been pooled for participation in a simulation).

To initiate a simulation, simulation manager 126 may identify and provide one or more NPC specifications to participating end user devices 140. An NPC specification may include one or more NPC parameters, NPC logic (e.g., AI software instructions), an NPC identifier, and/or other information used by end user device 140 to instantiate and control (hereinafter, "execute" or "executing" for convenience) one or more NPCs during a simulation. The one or more NPC parameters may specify one or more characteristics of an NPC, which may be used by a participating end user device 140 to configure an NPC. NPC logic may include predetermined instructions such that end user device 140 needs only execute the NPC logic (after compiling the NPC logic, if necessary). In some instances, NPC logic may be pre-stored at end user device 140, in which case an NPC specification may include an NPC identifier that identifies pre-stored NPC logic that should be used in a simulation.

An NPC specified by an NPC specification may include one or more player characteristics of a human player character or NPC. For instance, a given NPC may have a particular role (e.g., a sniper role) in a game, a particular skill level, a set of in-game items (e.g., an NPC may be configured to possess an in-game rifle and an in-game handgun, etc.), and/or other characteristics that conventional human players may possess.

Regardless of the manner in which an NPC is specified, each NPC specified by an NPC specification may be the same as or different from another NPC (in instances in which multiple NPCs are specified by the NPC specification). Furthermore, an NPC specification may specify that two or more NPCs act in an adversarial or cooperative relationship with respect to one another. Additionally, an NPC specification may specify that a first set of one or more NPCs executed at a first end user device 140 may act in an adversarial or cooperative relationship with respect to a second set of one or more NPCs executed at a second end user device 140. In this manner, an NPC specification may specify that various types of multiplayer interactions may be simulated by the NPCs across one or more end user devices 140. In these instances, simulation manager 126 may provide a first NPC specification to a first end user device 140 (e.g., one that specifies a first set of one more NPCs) and a second (different) NPC specification to a second end user device 140 (e.g., one that specifies a second (different) set of one more NPCs).

Managing Participating End User Devices and NPCs During Simulated NPC Gameplay

Upon initiation of a simulation, simulation manager 126 may cause test game engine 116 to interact with various NPCs executing at participating end user devices 140. For example, during a simulation, each participating end user device 140 may instantiate its set of NPCs and execute each instance of an NPC against test game engine 116. In this manner, gameplay among NPCs executing at participating end user device 140 may be simulated using test game engine 116. In an implementation, simulation manager 126 may assign an identifier for each instance of an NPC executing at a participating end user device 140 for a given simulation (as used hereinafter, an "NPC executing at a participating end user device 140" and similar language refers to an instance of an NPC that is instantiated by a participating end user device 140). Simulation manager 116 may maintain an NPC registry of NPC instances executing at participating end user devices 140 so that it may monitor each instance, as well identify a participating end user device 140 that executes a given NPC instance.

In an implementation, simulation manager 126 may monitor the participating end user devices 140 to ensure that the number of participating end user devices 140 continues to exceed a minimum number during a simulation. This is because a given participating end user device 140 may become unavailable during a simulation and be kicked out of the simulation so that end users are not impacted by simulations executing on their end user devices 140. Either the participating end user device 140 or simulation manager 126 may initiate the kick out. A participating end user device 140 may become unavailable when it changes states such that the minimum required computing capacity is no longer available (e.g., when an end user such as a human operator of a participating end user device 140 begins playing a game). Similarly, other (non-participating) end user devices 140 may enter an available state (e.g., when their corresponding end users stop playing a game) and may be pooled. As such, end user devices 140 may continually be pooled, de-pooled (e.g., removed from a pool), and kicked out from simulations.

In an implementation, simulation manager 126 may select a pooled end user device 140 to replace a participating end user device 140 that was kicked out from the simulation (hereinafter, a "kicked out end user device 140"). To do so, simulation manager 126 may provide a replacement end user device 140 with an NPC specification that was provided to the kicked out end user device 140. In this manner, one or more NPCs that were executing on the kicked out end user device 140 may be executed on the replacement end user device 140. The replacement end user device 140 may include an end user device 140 that is already participating and has additional computing capacity to execute the one or more NPCs that were executing on the kicked out end user device and/or may be a newly invited end user device.

In an implementation, simulation manager 126 may add or remove participating end user devices 140 for other reasons as well. For instance, simulation manager 126 may determine that computational requirements of a simulation are higher (or lower) than expected or that the simulation is at a point where more (or less) end user devices are required to execute the simulation. In these instances, simulation manager 126 may add or remove participating end user devices 140 from a given simulation, as appropriate.

In an implementation, to preserve a current state of a simulation, simulation manager 126 may update an NPC specification that was provided to a kicked out end user device 140 and provide the updated NPC specification to a replacement end user device 140. During the course of a simulation, for example, an NPC state may be affected by events of the simulation. For instance, a health of an NPC may be reduced during in-game combat (or increased if the NPC acquired a health power-up) or in-game ammunition carried by the NPC may be exhausted (or increased if the NPC acquired ammunition during the simulation). Other characteristics of the NPC may be changed during simulated gameplay as well.

An end user device 140 executing the NPC and/or simulation manager 126 may maintain an NPC state. For instance, before end user device 140 is kicked out, the latest known NPC state before the kick out may be preserved and used to update a corresponding NPC specification. In a particular example, simulation manager 126 may periodically update an NPC registry with a current state for each NPC executing at participating end user devices 140. As such, after such update, the NPC registry may include an NPC state for NPCs executing at participating end user devices 140 during a simulation.

Simulation manager 126 may identify a set of one or more NPCs executing at an end user device 140 to be kicked out (e.g., based on the NPC registry), obtain an NPC state for each NPC among the set of one or more NPCs (e.g., from the NPC registry), and generate an NPC specification based on the obtained NPC states. As such, the newly generated NPC specification is "updated" with respect to the original NPC specification provided to the end user device 140 to be kicked out. Simulation manager 126 may provide the updated NPC specification to the replacement end user device 140. In this manner, a given simulation may be unaffected when an end user device 140 is kicked out.

Other results of the simulation may likewise be carried over from a kicked out end user device 140 to a replacement end user device 140. For instance, if an NPC executing at a kicked out end user device 140 spawned another NPC such that the kicked out end user device 140 operated an additional NPC, the NPC specification may be updated to include the newly spawned NPC (which may also be reflected in the NPC registry). Likewise, if an NPC was terminated (e.g., killed during in-game combat) or otherwise should be removed, then the NPC specification may be updated to remove that NPC.

Analyzing Simulated NPC Gameplay

In an implementation, simulation analyzer 128 may monitor the simulation and obtain one or more simulation metrics associated therewith. The simulation metrics may include, without limitation, an NPC performance metric, a gameplay quality metric, a network performance metric that indicates a quality of a network connection, a fault metric, and/or other metric that may characterize one or more aspects of the simulation.

An NPC performance metric may indicate a performance of an NPC, which may be relative to other NPCs and/or game AI during a simulation. For example, an NPC performance metric may include, without limitation, a number of levels achieved by an NPC, a number of in-game kills, a number of points scored, a number in-game items acquired, a lap time achieved by an NPC driver, and/or other metric by which a player performance (whether a human player or NPC) may be assessed.

A gameplay quality metric may indicate a quality of gameplay during a simulation. The gameplay quality metric may be used as a proxy to determine whether a human player, if playing with/against an NPC, would enjoy the gameplay experience. For instance, a gameplay quality metric may include, without limitation, a length of a simulation (where longer gameplay sessions may indicate a greater quality of gameplay), an indication of whether adversarial gameplay was lopsided (where more evenly matched gameplay may indicate a greater quality of gameplay), and/or other metric that may indicate a quality of gameplay.

A network performance metric may indicate a quality of a network connection used by a participating end user device 140 during a simulation. For instance, a network performance metric may include, without limitation, a network latency measured during a simulation, a number or rate of network errors that occurred during the simulation, and/or other metric may be used to measure a quality of a network connection used during the simulation. Other performance metrics may be used in the same way as network, such as measurements of CPU or GPU usage, frame rate sustained at various times during simulated gameplay, number of transactions required with a server, etc.

A fault metric may indicate a fault related to software or hardware (other than network errors) that may have occurred during a simulation. For instance, a fault metric may include, without limitation, a number of errors that occurred during a simulation, a type of error that occurred during the simulation, and/or other abnormal execution conditions that may have occurred during the simulation.

Applying the Analysis of Simulated NPC Gameplay

Various parties may use the analysis (e.g., the various types of simulation metrics) from simulation analyzer 128 in various ways and in various contexts. For example, various systems such as matchmaking system 132, network testing system 134, debugging system 136, and/or other systems may use one or more simulation metrics in various ways. These and other systems may be separate from or integrated with computer system 110 and may each include one or more processors programmed using one or more computer program instructions. The following examples of uses and contexts of simulation metrics are described by way of illustration and not limitation, as other uses and contexts will be apparent based on the disclosure provided herein.

Matchmaking Contexts

In an implementation, the various simulation metrics may be used to characterize how an NPC will perform during gameplay, which may or may not be affected by a quality of network connections between end user devices 140. For example, matchmaking system 132 may use one or more simulation metrics to characterize an NPC, assess a quality of a match between two or more NPCs, and/or otherwise assess a performance of an NPC during a simulation.

Matchmaking system 132 may generate or update an NPC specification (e.g., based on input from a game designer or other user) and may assess how an NPC will perform during gameplay. To this end, matchmaking system 132 may provide the NPC specification to NPC gameplay simulator 120 as a simulation parameter, along with any other simulation parameters that specify other simulation conditions that should be used to test an NPC. In response, NPC gameplay simulator 120 may provide the NPC specification to one or more end user devices 140 during a simulation and then observe a performance of a corresponding NPC. Such performance may be assessed based on, for example, an NPC performance metric, a gameplay quality metric, and/or other simulation metrics.

Alternatively or additionally, matchmaking system 132 may determine a quality of a match of two or more NPCs. For instance, matchmaking system 132 may match together two or more NPCs to assess how well they play with one another in a cooperative or an adversarial relationship. In a particular example, matchmaking system 132 may use the simulation metrics (e.g., an NPC performance metric, a gameplay quality metric, a network performance metric, etc.) to assess how well a matched team of NPCs (which may be composed of identical NPCs or different types of NPCs) cooperatively play together. In another example, matchmaking system 132 may use the simulation metrics to assess how well a first set of one or more NPCs play against a second set of one or more NPCs. In the foregoing examples, by assessing different permutations of matches, matchmaking system 132 may be able to discern which NPCs are effective (e.g., based on an NPC performance metric), either individually or as a member of a team. In this manner, matchmaking system 132 may identify an NPC that should be matched with other NPCs or with human players during production versions of a networked video game. In some instances, matchmaking system 132 may incorporate a network performance metric to assess whether a given NPC should be provided to an end user device 140 during a production run of a networked video game. For example, matchmaking system 132 may determine that a particular NPC (e.g., one that is associated with time-sensitive actions) should not be teamed with a human player operating at an end user device 140 with known latency problems, as observed from one or more network performance metrics.

Quality of Network Connections Contexts

In an implementation, the various simulation metrics may be used to characterize a quality of network connections used by end user devices 140. For example, network testing system 134 may, over time, obtain network performance metrics (provided by simulation analyzer 128) that indicate a quality of network connections across end user devices 140 that participate in various simulations. As NPC gameplay simulator 120 initiates more simulations, more network quality data may be collected.

Network testing system 134 may build a network quality map of the quality of network connections based on the network performance metrics. Such a network quality map may be based on a per node basis (e.g., network quality of a network connection used by an individual end user device 140) and/or grouped by a characteristic (e.g., by geography, a particular network used, whether a wireless or wired connection is used, an identification of a game hosting service, end user device version, or type of Network Address Translation (NAT) connection, Internet Service Provider, and/or other grouping). In this manner, network testing system 134 may obtain information that indicates a quality of a network connection used by an individual end user device 140 and/or by groups of end user devices 140.

Network testing system 134 may use the network quality map to identify end user devices 140 for which network quality information is unavailable or sparse. For instance, network testing system 134 may obtain an identification of all end user devices 140 that have participated in a networked video game in a production environment and identify those devices in which network quality information is unavailable or sparse. Network testing system 134 may generate and provide one or more simulation parameters that specify that the identified devices should be targeted for testing during a simulation (subject to their availability). In response, NPC gameplay simulator 120 may initiate simulations in which the identified devices are invited to participate (e.g., the identified devices may take priority over other devices to participate in a given simulation). In this manner, network testing system 134 may generate comprehensive network quality maps of end user devices 140 that participate in networked video games. The network quality maps may be updated as more simulations are initiated over time.

A network quality map may be used by matchmaking system 132 to create a match (e.g., based on, for example, network latency) of players on two or more end user devices 140. In another example, a network quality map may be used by NPC gameplay simulator 120 to avoid using end user devices 140 with known poor quality network connections (or purposefully using such end user devices 140). Other uses of the network quality map may be used as well.

Debugging Contexts

In an implementation, one or more simulation metrics may be used to debug software and/or hardware in relation to networked video games. For example, debugging system 136 may use one or more simulation metrics to debug a new or updated component associated with networked video games. new or updated NPC, a new or updated game logic, a new or updated configuration file, a new or updated content package, a new or updated software package (e.g., operating system, application, GPU shader, etc.) at end user device 140, server hardware, hardware if end user device 140, and/or other component associated with networked video games. For instance, one or more fault metrics may be used to determine whether errors occurred during a simulation, the nature of such errors, and/or other information related to a fault condition. Such errors may be associated with a new or updated component.

For a new or updated NPC, for example, a certain outcome (e.g., an expected NPC performance) or behavior (e.g., perform some action) may be expected by a user, such as a developer of the NPC. A simulation metric (e.g., an NPC performance metric) or a fault metric (e.g., that indicates whether the action was performed) may be used to determine whether the expected outcome or behavior occurred during a simulation in which the NPC was simulated to play. Other examples of using fault metrics in association with a new or updated component may likewise be performed. For example, a new version of software or hardware of an end user device 140 may be invited to participate in a simulation to observe whether any expected outcomes or behaviors of NPCs executing thereon (or other expected game events) have occurred during the simulation.

End User Devices 140

End user device 140 may be configured as a gaming console, a handheld gaming device, a personal computer (e.g., a desktop computer, a laptop computer, etc.), a smartphone, a tablet computing device, and/or other device that can be programmed to participate in simulated gameplay of NPCs. Although not illustrated in FIG. 1, end user devices 140 may include one or more physical processors programmed by computer program instructions. For example, an agent 142 (illustrated as Agents 142A, 142B, . . . , 142N) may program one or more physical processors of end user device 140 to receive an NPC specification, instantiate one or more NPCs specified by the NPC specification, and execute one or more NPC instances during a simulation.

Although illustrated in FIG. 1 as a single component, computer system 110 and end user device 140 may each include a plurality of individual components (e.g., computer devices) each programmed with at least some of the functions described herein. In this manner, some components of computer system 110 and/or end user device 140 may perform some functions while other components may perform other functions, as would be appreciated. The one or more processors 112 may each include one or more physical processors that are programmed by computer program instructions. The various instructions described herein are exemplary only. Other configurations and numbers of instructions may be used, so long as the processor(s) 112 are programmed to perform the functions described herein.

Furthermore, it should be appreciated that although the various instructions are illustrated in FIG. 1 as being co-located within a single processing unit, in implementations in which processor(s) 112 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112 may be programmed by one or more additional instructions that may perform some or all of the functionality attributed herein to one of the instructions.

The various instructions described herein may be stored in a storage device 114, which may comprise random access memory (RAM), read only memory (ROM), and/or other memory. The storage device may store the computer program instructions (e.g., the aforementioned instructions) to be executed by processor 112 as well as data that may be manipulated by processor 112. The storage device may comprise floppy disks, hard disks, optical disks, tapes, or other storage media for storing computer-executable instructions and/or data.

The various databases 150 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The various components illustrated in FIG. 1 may be coupled to at least one other component via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

Figure 2:
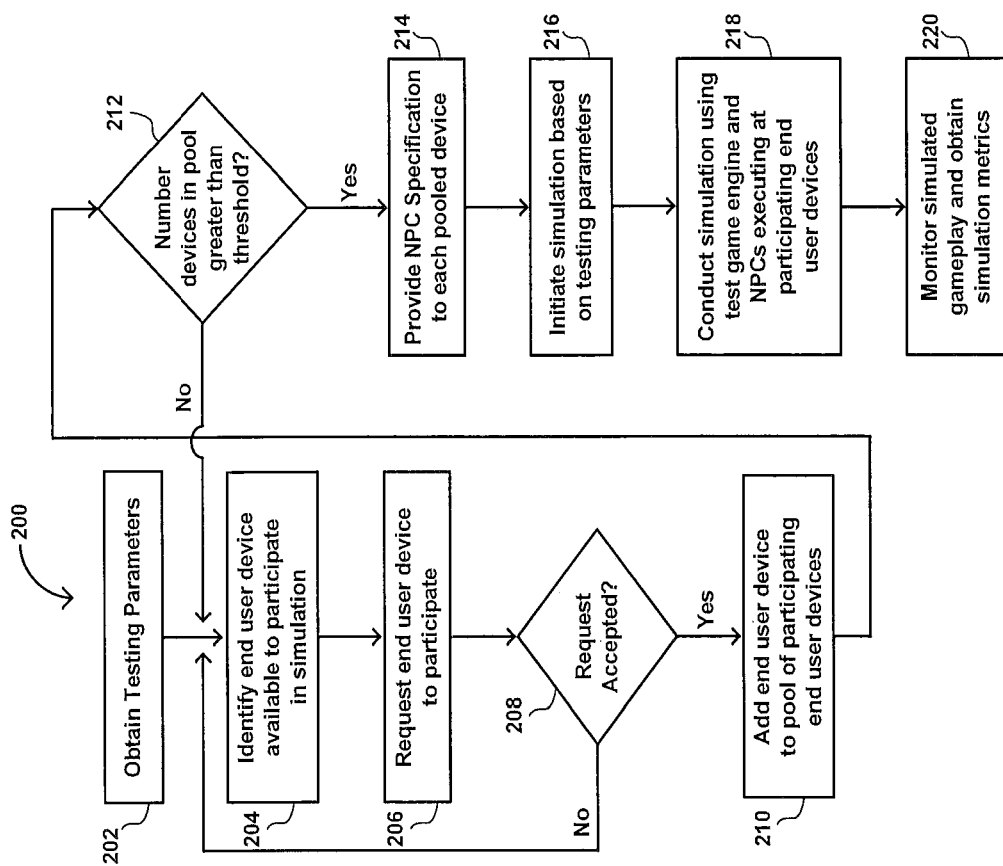
FIG. 2 depicts a process of simulating gameplay of non-player characters distributed across networked end user devices, according to an implementation of the invention.

FIG. 2 depicts a process 200 of simulating gameplay of non-player characters distributed across networked end user devices 140, according to an implementation of the invention. The various processing operations and/or data flows depicted in FIG. 2 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 202, process 200 may include obtaining one or more simulation parameters. The one or more simulation parameters may be predefined (e.g., default), provided by a simulation designer (e.g., a human operator), provided by a matchmaking system 132 to test matches or assess NPC performance, provided by a network testing system 134 to test or otherwise determine a quality of network connections, provided by debugging system 136 to debug new or updated components related to networked video games, and/or other source.

In an operation 204, process 200 may identify an end user device that is available to participate in a simulation. For example, process 200 or an external process may monitor an end user device that is connected to a production environment and determine when a computing capacity of the end user device exceeds a minimum value. Put another way, process 200 or an external process may determine that usage of computing capacity of the end user device falls below a maximum value.

In an operation 206, process 200 may request the identified end user device to participate in the simulation. For example, process 200 may provide an agent 142 operating at the identified end user device with a request to participate in the simulation.

In an operation 208, process 200 may determine whether the end user device has accepted the invitation. Responsive to a determination that the end user device has declined the invitation, processing may return to operation 204, where an end user device that is available is identified. Responsive to a determination that the end user device has accepted the invitation, processing may proceed to an operation 210, were the end user device is added to a pool of participating end user devices. In some implementations, process 200 may simply add an available end user device to the pool of participating end user devices without requesting to do so (thereby skipping operations 208 and 210).

In an operation 212, process 200 may determine whether the number of participating end user devices in the pool meets or exceeds a threshold value. For example, the threshold value may include a number of participating end user devices that should be used for the simulation. The threshold value may predefined, specified by a simulation parameter, dynamically determined by process 200 based on requirements of the simulation, and/or otherwise obtained by process 200.

Responsive to a determination that the number of participating end user devices in the pool does not exceed a threshold value, process 200 may return to an operation 204, where an end user device that is available is identified.

Responsive to a determination that the number of participating end user devices in the pool exceeds a threshold value, process 200 may provide an NPC specification to one or more participating end user devices in an operation 214. Process 200 may provide different participating end user devices with different NPC specifications. For example, a first participating end user device may be provided with a first NPC specification, while a second participating end user device may be provided with a second (different) NPC specification.

In an operation 216, process 200 may initiate a simulation based on the one or more simulation parameters. For example, process 200 may cause a connection to be established between computer system 110, which may host the simulation using test game engine 116, and the participating end user devices.

In an operation 218, process 200 may conduct simulation by, for example, receiving in-game input from one or more NPCs executing at one or more participating end user devices and facilitating interaction between the one or more NPCs and the test game engine. An NPC executing at a participating end user device may play: in cooperation with another NPC (either at the same or different participating end user device), in an adversarial relationship with another NPC (either at the same or different participating end user device), against the test game engine (with or without cooperation from other NPCs), and/or other ways that simulate single and multiplayer networked video gameplay.

In an operation 220, process 200 may collect one or more simulation metrics related to the simulation, which may terminate at the conclusion of a session terminating event such as, without limitation, one team of NPCs defeating another team, achievement of an objective, a period of time having elapsed, and/or other terminating event.

It should be noted that process 200 may be performed at periodic intervals (e.g., simulations run periodically), on-demand (e.g., initiated by a human operator, by an event such as a number of available end user devices becoming available), and/or other simulation triggering event.

Figure 3:
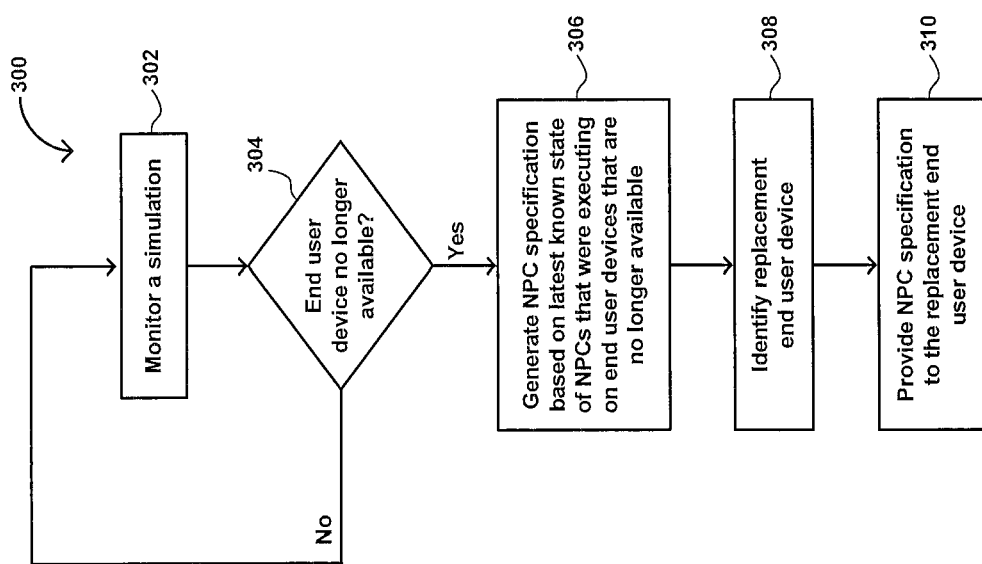
FIG. 3 depicts a process of replacing an end user device participating in a simulated NPC gameplay session that was kicked out of the simulated NPC gameplay session, according to an implementation of the invention.

FIG. 3 depicts a process 300 of replacing an end user device 140 participating in a simulation that was kicked out of the simulation, according to an implementation of the invention. The various processing operations and/or data flows depicted in FIG. 3 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 302, process 300 may monitor a simulation.

In an operation 304, process 300 may determine whether a participating end user device 140 is no longer available (because a network connection to the participating end user device 140 has been dropped, participating end user device 140 has removed itself from participation in the simulation, process 300 determines that the computational requirements for participation are no longer satisfied by the participating end user device, in which case process 300 removes the participating end user device 140 from participation, etc.).

Responsive to a determination that all participating end user devices 140 remain available, process 300 may continue monitoring the simulation in operation 302.

Responsive to a determination that a participating end user device 140 is no longer available, in an operation 306, process 300 may generate an NPC specification for one or more NPCs that were executing on the end user device 140 that is no longer available. The NPC specification may reflect the latest known state of the one or more NPCs that were executing on the end user device 140 that is no longer available.

In an operation 308, process 300 may identify an end user device 140 to replace the end user device 140 that was removed. For example, process 300 may identify an end user device 140 from among a listing of available devices that are available (e.g., satisfy the computational requirements for participation based on its current computational load) to participate in any simulation. The computational load may include, without limitation, a current processing usage, a physical memory (e.g., RAM) usage, and/or other computational loads that may be imposed on an end user device 140.

In an operation 310, process 300 may provide the NPC specification to the replacement end user device 140. In this manner, the replacement end user device 140 may seamlessly execute any NPCs that were executing on the removed end user device 140, as well as maintain the state of such NPCs at the time of removal.

Figure 4:
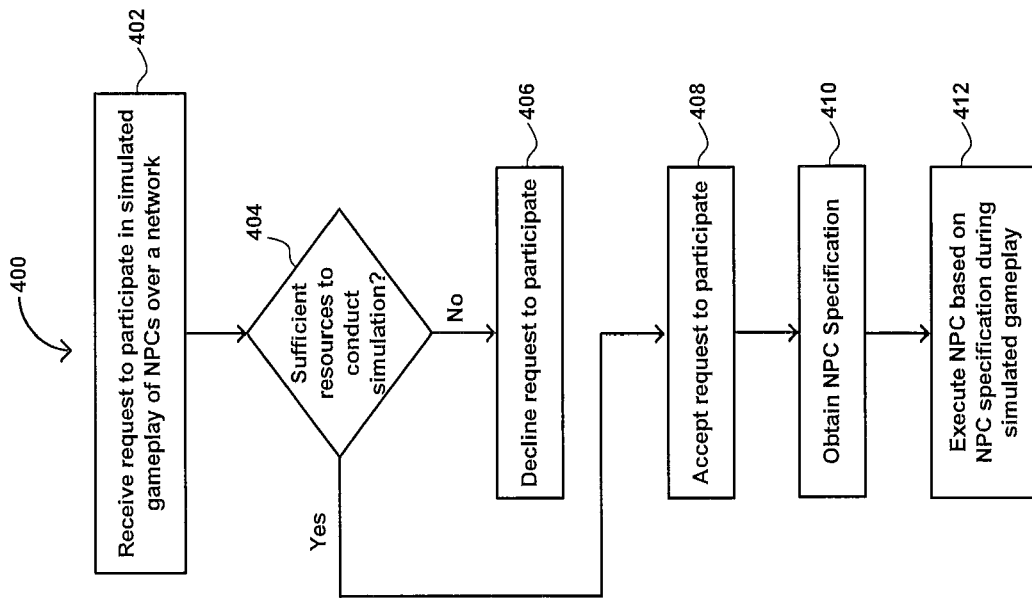
FIG. 4 depicts a process of an end user device participating in a simulated NPC gameplay session by executing an NPC to simulate gameplay of the NPC in association with a test game engine and NPCs executing at other end user devices over a network, according to an implementation of the invention.

FIG. 4 depicts a process 400 of an end user device 140 participating in a simulation by executing an NPC to simulate gameplay of the NPC in association with a test game engine 116 and NPCs executing at other end user devices over a network 102, according to an implementation of the invention. The various processing operations and/or data flows depicted in FIG. 4 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 402, process 400 may receive a request to participate in a simulation in which gameplay of an NPC is simulated using test game engine 116. For example, process 400 may receive the request from computer system 110.

In an operation 404, process 400 may determine whether sufficient computing capacity are available at end user device 140 to participate (which may be separate from, but similar to, the computational resource determination made by process 200). For example, and without limitation, process 400 may determine whether a processor load is sufficiently low and/or whether a memory (e.g., RAM) usage is sufficiently low. Alternatively or additionally, in an implementation, process 400 may prompt a user of end user device 140 to accept or decline the request. If a user has not responded to the prompt within a certain time period, then process 400 may automatically determine whether to accept the request.

Responsive to a determination that there is not sufficient computing capacity, in an operation 406, process 400 may decline the request to participate. On the other hand, responsive to a determination that there is sufficient computing capacity, in an operation 408, process 400 may accept the request to participate.

In an operation 410, process 400 may obtain an NPC specification. For example, process 400 may receive the NPC specification from computer system 110, which provides the NPC specification responsive to acceptance of the request to participate by process 400.

In an operation 412, process 400 may instantiate an NPC based on the NPC specification. For example, process 400 may obtain NPC parameters from the NPC specification, configure an NPC based on core NPC code locally stored at end user device 140, and instantiate the NPC. Alternatively or additionally, process 400 may obtain NPC code (e.g., source code to be compiled, executable code already compiled, or interpreted code) and configure an NPC based on the NPC code. In whichever manner an NPC is configured and instantiated, process 400 may control the NPC locally on end user device 140 based on the NPC specification. In this manner, a behavior of an NPC may be dictated by the NPC specification. A given NPC gameplay simulation may therefore involve different NPCs each having their own unique behaviors.

Figure 5:
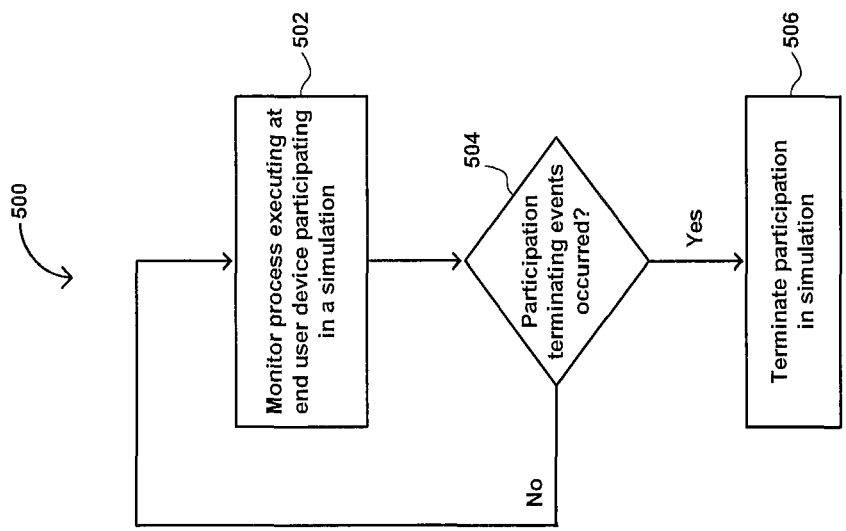
FIG. 5 depicts a process of terminating participation in a simulated NPC gameplay session, according to an implementation of the invention.

FIG. 5 depicts a process 500 of terminating participation in a simulation, according to an implementation of the invention. The various processing operations and/or data flows depicted in FIG. 5 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 502, process 500 may monitor one or more processes occurring at an end user device 140 participating in a simulation.

In an operation 504, process 500 may determine whether one or more participation terminating events have occurred based on the monitoring. A participation terminating event may include, without limitation, a minimum computational requirement for participation in the simulation is no longer satisfied, waking up from an idle or standby state, initiation of gameplay in a production environment, explicit input from a user to terminate participation, and/or other events that can cause terminate participation.

Responsive to a determination that one or more participation terminating events have not occurred, process 500 may return to operation 502 to continue monitoring the one or more processes.

Responsive to a determination that one or more participation terminating events have occurred, in an operation 506, process 500 may terminate participation in the simulation. For example, process 500 may logoff or otherwise exit the simulation.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer implemented method of simulating a gameplay of a video game with non-player characters (NPCs), the method comprising:
   conducting the gameplay of the video game using a plurality of networked end user devices, wherein each of the networked end user devices is adapted to be used by a human player and wherein each of the networked end user devices is configured to communicate with a computer system that is positioned remote from, and is distinct from, the networked end user devices and adapted to host the video game;
   determining that one of the plurality of networked end user devices is no longer available to conduct the gameplay of the video game;
   generating a specification of one of the NPCs based on a latest known state of said one of the NPCs executing before the one of the plurality of networked end user devices became no longer available;
   identifying, by the computer system, a replacement networked end user device;
   using the replacement networked end user device together with the remaining plurality of networked end user devices to conduct the gameplay of the video game;
   providing the generated specification of the one of the NPCs to the replacement networked end user device;
   continuing to conduct, by the computer system, the gameplay session including a simulated gameplay of the one of the NPCs; and
   transmitting, from the computer system to each of the plurality of networked end user devices and the replacement networked end user device, the simulated NPC gameplay session, including the simulated gameplay of the one of the NPCs from the replacement networked end user device.

2. The computer implemented method of claim 1, wherein the replacement networked end user device is identified based on whether it has a spare computing capacity that can be used to instantiate the specification of the one of the NPCs.

3. The computer implemented method of claim 2, further comprising receiving data, at the computer system, indicative of the one of the NPCs specifically being executed by the replacement networked end user device.

4. The computer implemented method of claim 1, further comprising obtaining, by the computer system, one or more simulation metrics that describes an aspect of the simulated NPC gameplay session.

5. The computer implemented method of claim 4, wherein the one or more simulation metrics comprises an NPC performance metric, the method further comprising determining a performance of the one of the NPCs during the simulated gameplay session based on the NPC performance metric.

6. The computer implemented method of claim 4, wherein the one or more simulation metrics comprise a gameplay quality metric, the method further comprising determining a quality of a match of the one of the NPCs and a second one of the NPCs based on the gameplay quality metric.

7. The computer implemented method of claim 6, wherein the one or more simulation metrics comprise a network performance metric, the method further comprising determining a quality of a network connection based on the network performance metric.

8. The computer implemented method of claim 7, wherein the one or more simulation metrics comprise a gameplay quality metric, the method further comprising determining a quality of a match of the one of the NPCs and the second one of the NPCs based on the gameplay quality metric and the quality of the network connection.

9. The computer implemented method of claim 7, wherein the quality of the network connection reflects network connectivity of a grouping of the plurality of networked end user devices and a second end user device, wherein the grouping is based on a geographic location, a particular network used, an Internet Service Provider associated with the plurality of networked end user devices or the second end user device, whether a wireless or wired connection is used, an identification of a game hosting service, end user device version, or type of Network Address Translation (NAT) connection.

10. The computer implemented method of claim 4, wherein the one or more simulation metrics comprise a fault metric, the method further comprising determining whether a fault has occurred with hardware or software involved in the simulated gameplay session based on the fault metric.

11. A system for simulating a gameplay of a video game with non-player characters (NPCs) in a multi-player gaming network, wherein the multi-player gaming network comprises a plurality of end user devices each adapted to be used by a human player and wherein the plurality of end user devices are located remote from each other, the system comprising:
   at least one game server in data communication with each of the networked end user devices, wherein the at least one game server is positioned remote from, and is distinct from, the networked end user devices and is adapted to host a video game, and the at least one game server is adapted to:
   conduct the gameplay of the video game using the plurality of networked end user devices;
   determine that one of the plurality of networked end user devices is no longer available to conduct the gameplay of the video game;
   generate a specification of one of the NPCs based on a latest known state of said one of the NPCs executing before the one of the plurality of networked end user devices became no longer available;
   identify a replacement networked end user device;
   use the replacement networked end user device together with the remaining plurality of networked end user devices to conduct the gameplay of the video game;
   provide the generated specification of the one of the NPCs to the replacement networked end user device;
   continue to conduct the gameplay session including a simulated gameplay of the one of the NPCs; and
   transmit to each of the plurality of networked end user devices and the replacement networked end user device, the simulated NPC gameplay session, including the simulated gameplay of the one of the NPCs from the replacement networked end user device.

12. The system of claim 11, wherein the at least one game server is configured to identify the replacement networked end user device based on whether it has a spare computing capacity that can be used to instantiate the specification of the one of the NPCs.

13. The system of claim 12, wherein the at least one game server is further configured to receive data indicative of the one of the NPCs specifically being executed by the replacement networked end user device.

14. The system of claim 11, wherein the at least one game server is further configured to obtain one or more simulation metrics that describes an aspect of the simulated NPC gameplay session.

15. The system of claim 14, wherein the one or more simulation metrics comprises an NPC performance metric, the system further comprising the at least one game server configured to determine a performance of the one of the NPCs during the simulated gameplay session based on the NPC performance metric.

16. The system of claim 15, wherein the one or more simulation metrics comprise a gameplay quality metric, the system further comprising the at least one game server configured to determine a quality of a match of the one of the NPCs and a second one of the NPCs based on the gameplay quality metric.

17. The system of claim 14, wherein the one or more simulation metrics comprise a network performance metric, the system further comprising the at least one game server configured to determine a quality of a network connection based on the network performance metric.

18. The system of claim 14, wherein the one or more simulation metrics comprise a gameplay quality metric, the system further comprising the at least one game server configured to determine a quality of a match of the one of the NPCs and the second one of the NPCs based on the gameplay quality metric and the quality of the network connection.

19. The system of claim 18, wherein the quality of the network connection reflects network connectivity of a grouping of the plurality of networked end user devices and a second end user device, wherein the grouping is based on a geographic location, a particular network used, an Internet Service Provider associated with the plurality of networked end user devices or the second end user device, whether a wireless or wired connection is used, an identification of a game hosting service, end user device version, or type of Network Address Translation (NAT) connection.

20. The system of claim 15, wherein the one or more simulation metrics comprise a fault metric, the system further comprising the at least one game server configured to determine whether a fault has occurred with hardware or software involved in the simulated gameplay session based on the fault metric.

* * * * *